United States Patent
Sun et al.

(10) Patent No.: US 10,781,110 B2
(45) Date of Patent: Sep. 22, 2020

(54) MANUFACTURING METHOD OF POSITIVE ACTIVE MATERIAL PRECURSOR FOR SODIUM RECHARGEABLE BATTERIES, POSITIVE ACTIVE MATERIAL PRECURSOR FOR SODIUM RECHARGEABLE BATTERIES MADE BY THE SAME, AND MANUFACTURING METHOD OF POSITIVE ACTIVE MATERIAL FOR SODIUM RECHARGEABLE BATTERIES, POSITIVE ACTIVE MATERIAL FOR SODIUM RECHARGEABLE BATTERIES MADE BY THE SAME

(71) Applicant: IUCF-HYU(INDUSTRY-UNIVERSITY COOPERATION FOUNDATION HANYANG UNIVERSITY), Seoul (KR)

(72) Inventors: Yang Kook Sun, Seoul (KR); Seung Min Oh, Gumi-si (KR); Min Woo Jang, Seoul (KR)

(73) Assignee: IUCF-HYU(INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 158 days.

(21) Appl. No.: 15/993,174

(22) Filed: May 30, 2018

(65) Prior Publication Data
US 2018/0273396 A1    Sep. 27, 2018

Related U.S. Application Data

(60) Division of application No. 14/716,362, filed on May 19, 2015, now abandoned, which is a
(Continued)

(30) Foreign Application Priority Data

| Nov. 19, 2012 | (KR) | .................... 10-2012-0130824 |
| Nov. 19, 2013 | (KR) | .................... 10-2013-0140907 |
| Nov. 19, 2013 | (KR) | .................... 10-2013-0140911 |

(51) Int. Cl.
*H01M 4/02* (2006.01)
*C01G 53/00* (2006.01)
(Continued)

(52) U.S. Cl.
CPC ........... *C01G 53/50* (2013.01); *C01G 53/006* (2013.01); *H01M 4/364* (2013.01); *H01M 4/505* (2013.01);
(Continued)

(58) Field of Classification Search
None
See application file for complete search history.

(56) References Cited

U.S. PATENT DOCUMENTS

2010/0248001 A1    9/2010    Kuze et al.
2010/0266900 A1    10/2010    Makidera et al.
(Continued)

FOREIGN PATENT DOCUMENTS

CN    101908615 B    8/2013
EP    0903796 A1    5/2018
(Continued)

OTHER PUBLICATIONS

Donghan Kim, et al., "Layered Na[Ni1/3 Fe1/3 Mn1/3 ]O2 cathodes for Na-ion battery application", Electrochemistry Communications 18 (2012) 66-69.
(Continued)

*Primary Examiner* — Haixia Zhang
(74) *Attorney, Agent, or Firm* — Lucas & Mercanti, LLP

(57) ABSTRACT

Disclosed is a method for producing a cathode active material precursor for a sodium secondary battery by using
(Continued)

a coprecipitation technique and a cathode active material precursor for a sodium secondary battery produced thereby, and a cathode active material for a sodium secondary battery using the cathode active material precursor for a sodium secondary battery and a method for producing the same.

8 Claims, 36 Drawing Sheets

Related U.S. Application Data continuation-in-part of application No. PCT/KR2013/010520, filed on Nov. 19, 2013, which is a continuation-in-part of application No. PCT/KR2013/010521, filed on Nov. 19, 2013.

(51) Int. Cl.
  *H01M 4/36* (2006.01)
  *H01M 4/505* (2010.01)
  *H01M 4/525* (2010.01)
  *H01M 10/054* (2010.01)

(52) U.S. Cl.
  CPC ......... *H01M 4/525* (2013.01); *C01P 2002/72* (2013.01); *C01P 2004/03* (2013.01); *C01P 2004/51* (2013.01); *C01P 2004/52* (2013.01); *C01P 2004/61* (2013.01); *C01P 2006/11* (2013.01); *C01P 2006/40* (2013.01); *H01M 10/054* (2013.01); *H01M 2004/028* (2013.01)

(56) References Cited

U.S. PATENT DOCUMENTS

| 2011/0159345 | A1 | 6/2011 | Makidera et al. | |
|---|---|---|---|---|
| 2013/0224588 | A1 | 8/2013 | Kageura | |
| 2013/0323590 | A1* | 12/2013 | Kageura | H01M 4/131 429/211 |

FOREIGN PATENT DOCUMENTS

| JP | 2011070994 A | 4/2011 |
|---|---|---|
| KR | 20050058968 A | 6/2005 |
| KR | 20100120138 A | 11/2010 |
| KR | 10-2013-0043938 A | 5/2013 |
| WO | 2012060295 A1 | 5/2012 |
| WO | 2012111681 A1 | 8/2012 |
| WO | 2014077662 A1 | 5/2014 |
| WO | 2014077663 A1 | 5/2014 |

OTHER PUBLICATIONS

Korean Office Action for corresponding Korean Application No. KR10-2013-0140911 dated Nov. 30, 2015.

Sathiya, M, et al., "Synthesis, Structure, and Electrochemical Properties of the Layered Sodium Insertion Cathode Material: NaNi1/3Mn1/3Co1/3O2", Chem. Mater., Apr. 17, 2012, vol. 24, No. 10, pp. 1846-1853.

Yabuuchi, N. et al., "Synthesis and Electrode Performance of O3-Type NaFeO2-NaNi1/2 Mn1/2O2 Solid Solution for Rechargeable Sodium Batteries", Journal of the Electrochemical Society, 2013, vol. 160, No. 5, pp. A3131-A3137.

International Search Report for International Application No. PCT/KR2013/010521(2 Pages) (dated Mar. 25, 2014).

International Search Report for International Application No. PCT/KR2013/010520 (2 Pages) (dated Mar. 25, 2014).

* cited by examiner 1.5–3.9V – 1:2:1
1.5–3.8V – 1:3:1
1.5–3.7V – 1:4:1

INITIAL CHARGE AND DISCHARGE 1.5-4.3V, 0.2C

MANUFACTURING METHOD OF POSITIVE ACTIVE MATERIAL PRECURSOR FOR SODIUM RECHARGEABLE BATTERIES, POSITIVE ACTIVE MATERIAL PRECURSOR FOR SODIUM RECHARGEABLE BATTERIES MADE BY THE SAME, AND MANUFACTURING METHOD OF POSITIVE ACTIVE MATERIAL FOR SODIUM RECHARGEABLE BATTERIES, POSITIVE ACTIVE MATERIAL FOR SODIUM RECHARGEABLE BATTERIES MADE BY THE SAME

CROSS REFERENCE TO RELATED APPLICATIONS

This application is a divisional application of U.S. patent application Ser. No. 14/716,362 filed May 19, 2015, now abandoned, which is a continuation-in-part of PCT/KR2013/010520 filed Nov. 19, 2013 and PCT/KR2013/010521 filed Nov. 19, 2013, both of which claim the benefit of Korean patent applications KR 10-2012-0130824 filed Nov. 19, 2012, KR 10-2013-0140907 filed Nov. 19, 2013, KR 10-2012-0131027 filed Nov. 19, 2012, and KR 10-2013-0140911 filed Nov. 19, 2013, the contents of each of which are incorporated herein by reference in their entirety.

FIELD OF THE INVENTION

Embodiments of the inventive concepts described herein relate to a method for producing a cathode active material precursor for a sodium secondary battery by using a coprecipitation technique and a cathode active material precursor for a sodium secondary battery produced thereby, and a cathode active material for a sodium secondary battery using the cathode active material precursor for a sodium secondary battery and a method for producing the same.

BACKGROUND OF THE INVENTION

At present, a lithium ion secondary battery using a non-aqueous electrolytic solution prepared by dissolving an electrolytic salt in a non-aqueous solvent and a lithium ion moving between the anode and the cathode for charging and discharging is widely used as a secondary battery having a high energy density. A lithium ion battery which contains a lithium transition metal oxide as the cathode material and utilizes a lithium ion insertion reaction is commercially available. However, lithium contained in the lithium ion battery is expensive, and thus a battery which is inexpensive and has a higher capacity is required.

Recently, research on a sodium ion secondary battery using a sodium ion instead of a lithium ion has been started. It is possible to produce a secondary battery at low cost if a secondary battery using a sodium ion instead of a lithium ion is successfully produced since sodium is an abundant resource having a great amount of deposits.

In JP 2007-287661 A, a secondary battery including a positive electrode using a composite metal oxide obtained by calcining a raw material having a composition ratio (Na:Mn:Co) of Na, Mn and Co of 0.7:0.5:0.5 and a negative electrode composed of a sodium metal is specifically described. In addition, in JP 2005-317511 A, $\alpha$-NaFeO$_2$ having a hexagonal (layered rock salt-type) crystal structure is specifically disclosed as a composite metal oxide and this composite metal oxide is obtained by mixing Na$_2$O$_2$ and Fe$_3$O$_4$ and calcining the mixture at from 600 to 700° C. in the air. However, a sodium secondary battery of the prior art is not satisfactory in lifespan characteristics, that is, the discharge capacity retention when the charge and discharge is repeated.

The most general method to produce a cathode active material for a lithium secondary battery or a sodium secondary battery of the prior art is a solid phase reaction method in which the powders of carbonate salts or hydroxides of the respective constituent elements as raw materials are subjected to the mixing and calcining process several times. However, the solid phase reaction method has disadvantages that it is difficult to form the solid solutions of the solid phases, impurities are easily mixed therein at the time of mixing, it is difficult to uniformly control the size of particles, and a high temperature and a long production time are required at the time of manufacture.

On the other hand, among the wet methods, the coprecipitation technique has advantages that it is possible to control the constituent elements in the atomic range and to produce a spherical composite metal carbonate. However, the solid phase reaction method is mainly adopted in order to produce a cathode active material for a sodium secondary battery of the prior art, but the method to produce a cathode active material precursor and a cathode active material for a sodium secondary battery by adopting the coprecipitation technique is rarely investigated.

SUMMARY OF THE INVENTION

Problems to Solve

Embodiments of the inventive concepts provide a method for producing a cathode active material precursor for a sodium secondary battery by using a coprecipitation technique and a cathode active material precursor for a sodium secondary battery produced thereby.

Embodiments of the inventive concepts also provide a cathode active material for a sodium secondary battery using the cathode active material precursor for a sodium secondary battery and a method for producing the same.

Tools for Problem Solving

One aspect of embodiments of the inventive concept is directed to provide a method for producing a cathode active material precursor for a sodium secondary battery by using a coprecipitation technique, the method including:

(a) introducing distilled water and a first pH adjusting agent into a coprecipitation reactor, supplying air or a nitrogen gas to the reactor, and maintaining a pH in the reactor at from 6.5 to 7.5 while stirring;

(b) adjusting the pH in the reactor at from 6.5 to 11 by continuously introducing a second pH adjusting agent into the and mixing the mixture; and (c) forming particles of a cathode active material precursor for a sodium secondary battery by introducing an aqueous solution of transition metal compounds containing a nickel salt, an iron salt, and a manganese salt in an equivalent ratio and a complexing agent into the reactor.

In the method for producing a cathode active material precursor for a sodium secondary battery by using a coprecipitation technique, ammonia or ammonium sulfate may be used as the first pH adjusting agent.

In the method for producing a cathode active material precursor for a sodium secondary battery by using a coprecipitation technique according to the embodiments of the inventive concept, the second pH adjusting agent in (b) above is ammonium oxalate, KOH, or NaOH.

In the method for producing a cathode active material precursor for a sodium secondary battery by using a coprecipitation technique according to the embodiments of the inventive concept, the pH in the reactor is adjusted to from 10 to 11 in the case of introducing NaOH or KOH as the second pH adjusting agent in (b) above and the pH in the reactor is adjusted to from 6.5 to 11 in the case of introducing ammonium oxalate as the second pH adjusting agent in (b) above.

In the method for producing a cathode active material precursor for a sodium secondary battery by using a coprecipitation technique according to the embodiments of the inventive concept, the nickel salt is selected from the group consisting of nickel sulfate, nickel nitrate, nickel chloride, nickel fluoride, nickel acetate, and nickel hydroxide, the iron salt is selected from the group consisting of iron sulfate, iron nitrate, iron chloride, iron fluoride, iron acetate, and iron hydroxide, and the manganese salt is selected from the group consisting of manganese sulfate, manganese nitrate, manganese chloride, manganese fluoride, manganese acetate, and manganese hydroxide in (c) above.

In the method for producing a cathode active material precursor for a sodium secondary battery by using a coprecipitation technique according to the embodiments of the inventive concept, the complexing agent is selected from the group consisting of an aqueous solution of ammonia ($NH_4OH$), ammonium sulfate (($NH_4)_2SO_4$), ammonium nitrate ($NH_4NO_3$), and diammonium hydrogen phosphate (($NH_4)_2HPO_4$) in (c) above.

In the method for producing a cathode active material precursor for a sodium secondary battery by using a coprecipitation technique according to the embodiments of the inventive concept, a ratio of a concentration of the complexing agent to a concentration of the aqueous solution of a transition metal compound is from 0.8 to 1.2 in (c) above.

Another aspect of embodiments of the inventive concept is directed to provide a cathode active material precursor for a sodium secondary battery, which is produced by the method for producing a cathode active material precursor according to the embodiments of the inventive concept, has a spherical shape having a particle size of from 5 to 15 μm, and exhibits a monodisperse type particle size distribution.

The cathode active material precursor for a sodium secondary battery according to the embodiments of the inventive concept is represented by any one of the following Chemical Formulas 1 to 3:

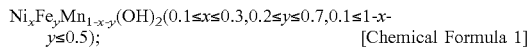
[Chemical Formula 1]

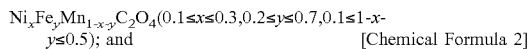
[Chemical Formula 2]

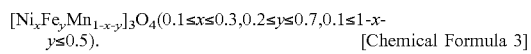
[Chemical Formula 3]

Still another aspect of embodiments of the inventive concept is directed to provide a cathode active material for a sodium secondary battery produced using the cathode active material precursor for a sodium secondary battery according to the embodiments of the inventive concept.

The cathode active material for a sodium secondary battery according to the embodiments of the inventive concept is represented by $Na_x[Ni_yFe_zMn_{1-y-z}]O_2$ ($0.8 \le x \le 1.2$, $0.05 \le y \le 0.9$, $0.05 \le z \le 0.9$, $0.05 \le 1-y-z \le 0.9$) and has an $O_3$-type crystal structure.

The cathode active material for a sodium secondary battery according to the embodiments of the inventive concept has a spherical shape having a particle size of from 5 to 15 μm and exhibits a monodisperse type particle size distribution.

The cathode active material for a sodium secondary battery according to the embodiments of the inventive concept has three peaks appearing at 2θ=in a range of from 30° to 40° and the peak (104) of a main peak appearing at 2θ=in a range of from 40° to 45° in XRD pattern.

The cathode active material for a sodium secondary battery according to the embodiments of the inventive concept has a tapped density of from 1.0 to 2.4 g/cc.

Yet another aspect of embodiments of the inventive concept is directed to provide a method for producing a cathode active material for a sodium secondary battery according to the embodiments of the inventive concept, the method including:

mixing the cathode active material precursor for a sodium secondary battery according to the embodiments of the inventive concept; and subjecting the mixture thus obtained to a heat treatment.

In the method for producing a cathode active material for a sodium secondary battery according to the embodiments of the inventive concept, the sodium compound is sodium carbonate, sodium nitrate, sodium acetate, sodium hydroxide, hydrates of sodium hydroxide, sodium oxide, or one of their combinations.

In the method for producing a cathode active material for a sodium secondary battery according to the embodiments of the inventive concept, the heat treatment is conducted at from 800° C. to 1000° C.

Still yet another aspect of embodiments of the inventive concept is directed to provide a sodium secondary battery including the cathode active material for a sodium secondary battery according to the embodiments of the inventive concept.

Effect of the Invention

The method for producing a cathode active material precursor for a sodium secondary battery by using a coprecipitation technique according to the embodiments of the inventive concept utilizes a coprecipitation technique and appropriately adjusts the kind of the complexing agent and the pH value so that a cathode active material precursor for a sodium secondary battery which exhibits improved lifespan characteristics and has a new composition and a cathode active material for a sodium secondary battery using this precursor can be provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION OF THE INVENTION

Figure 1:
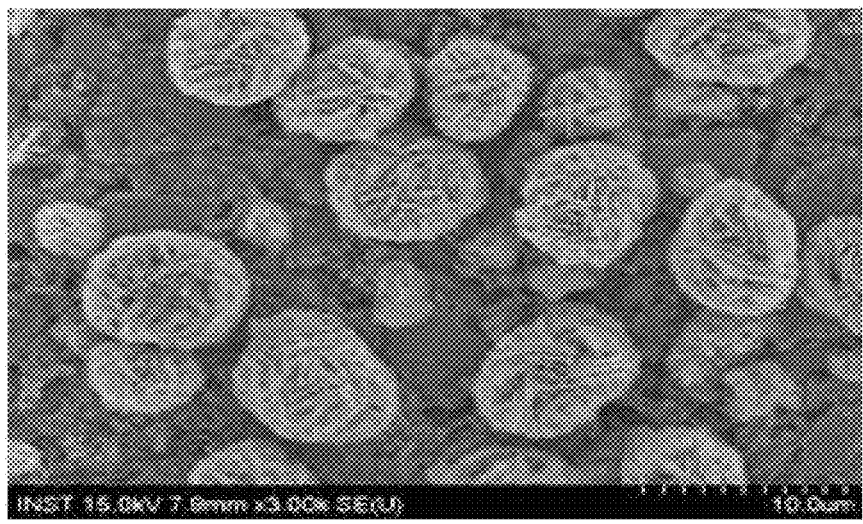
FIGS. 1 to 4 illustrate the SEM images of the precursors produced in Examples of the embodiments of the inventive concept.
Figure 1:
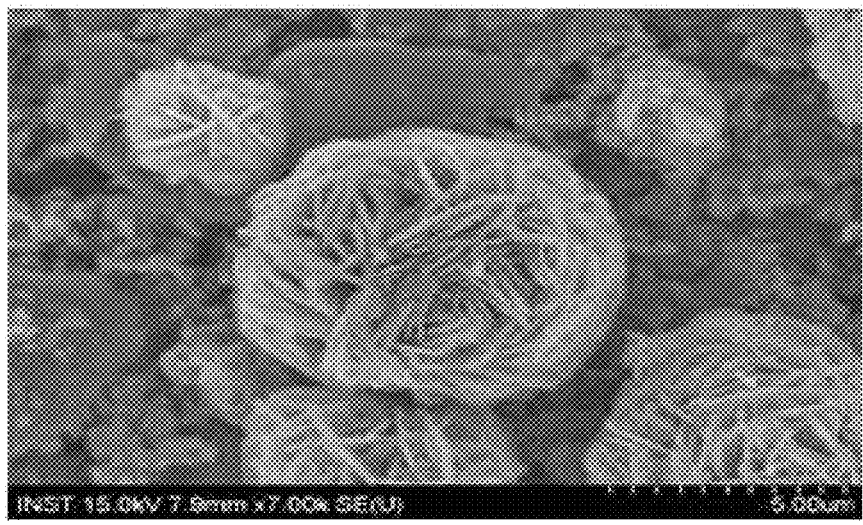
Figure 2:
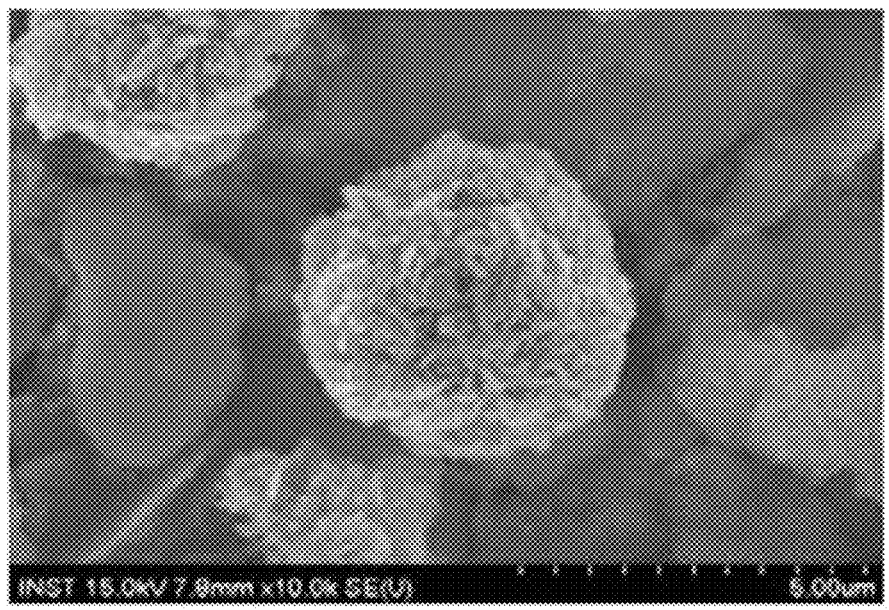
Figure 2:
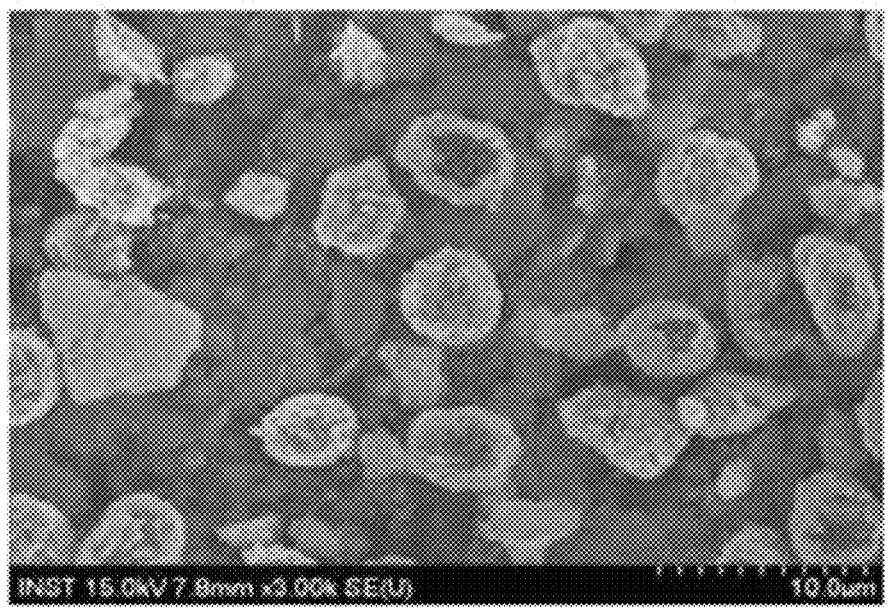
Figure 3:
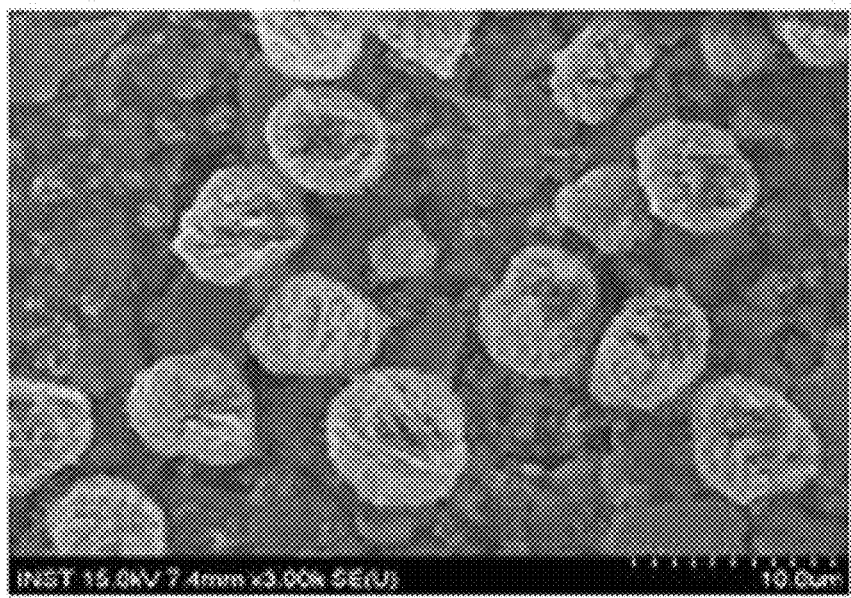
Figure 3:
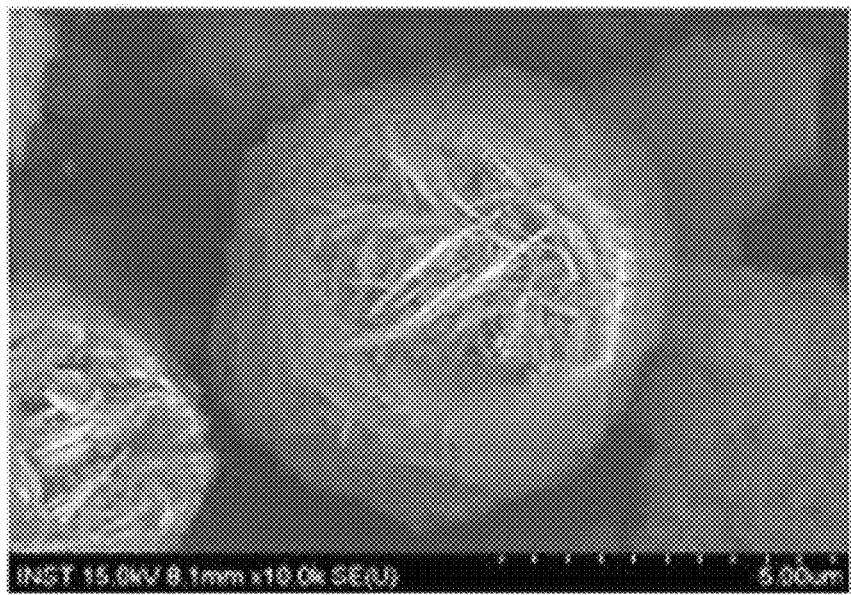
Figure 4:
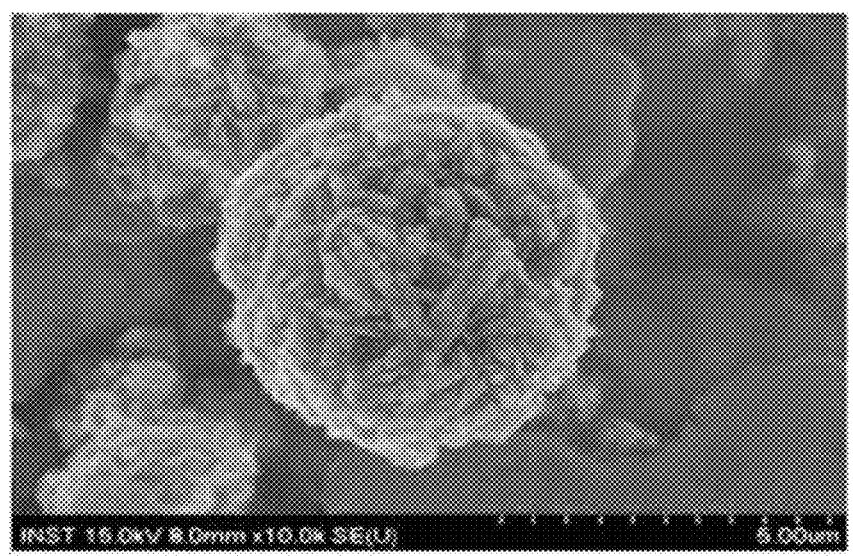
Figure 4:
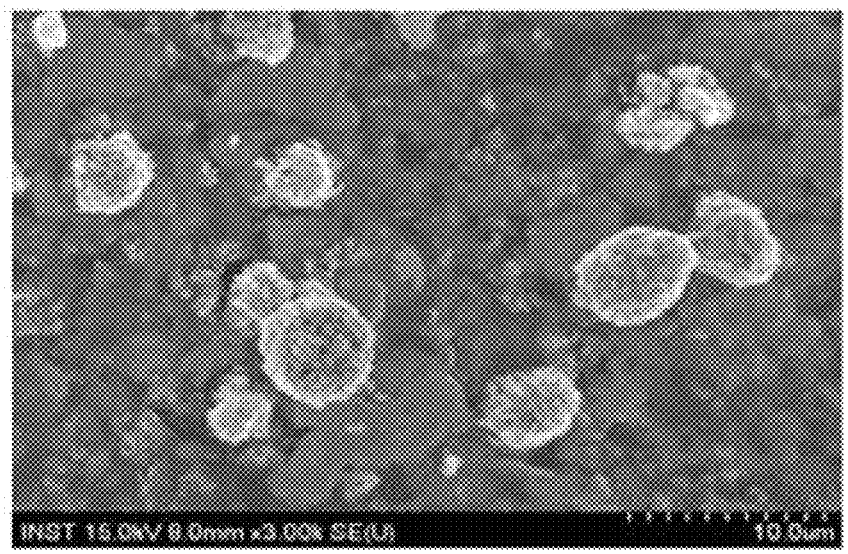
Figure 5:
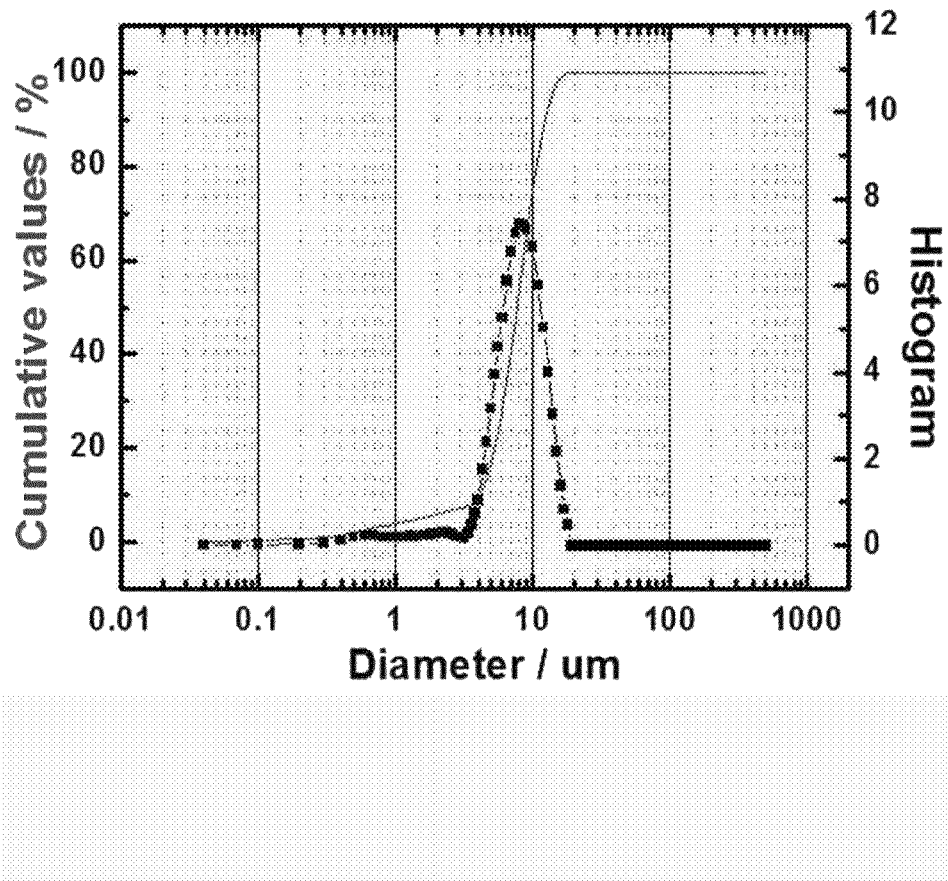
FIGS. 5 to 8 illustrate the measurement results of the particle size distribution of the precursors produced in Examples of the embodiments of the inventive concept.
Figure 6:
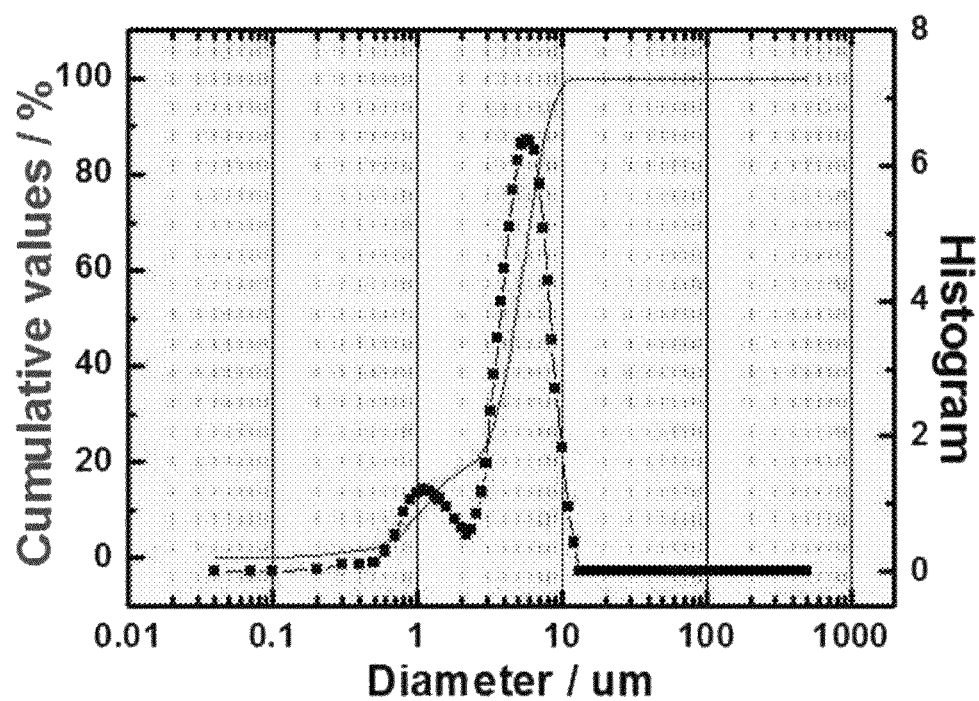
Figure 7:
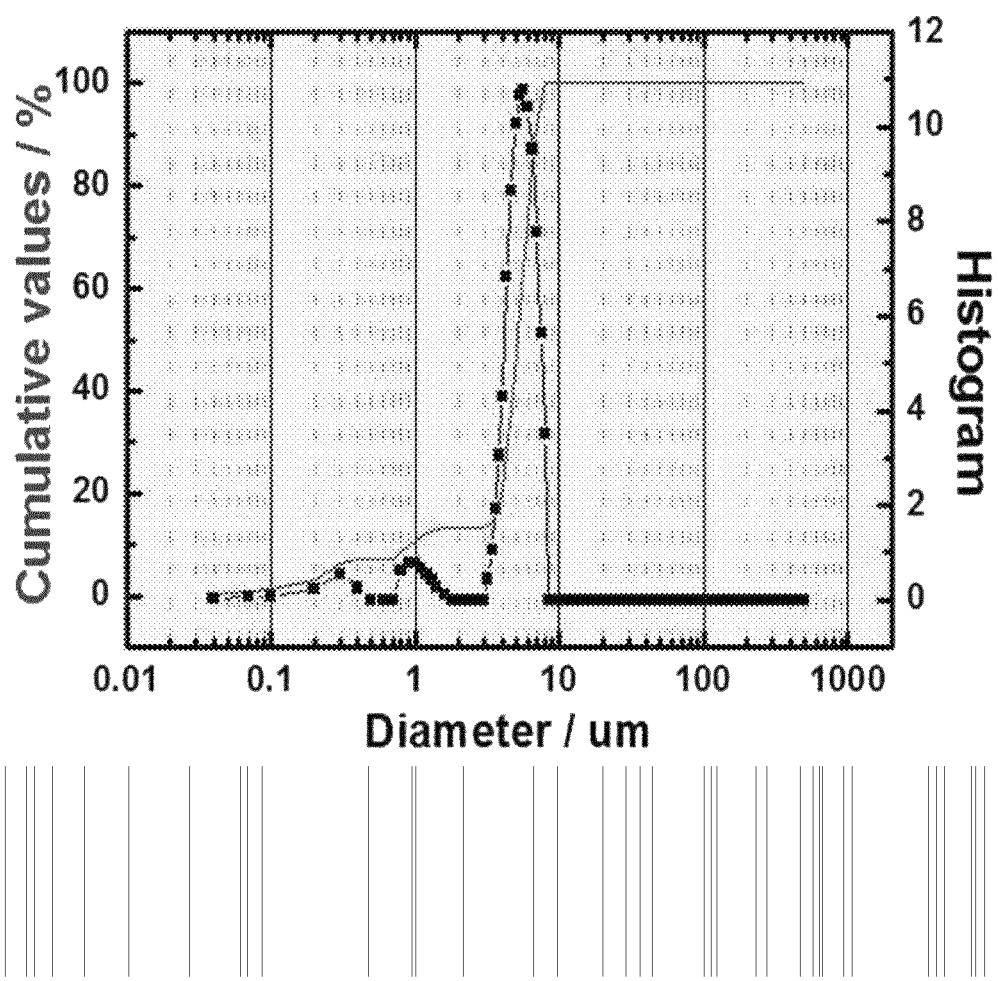
Figure 8:
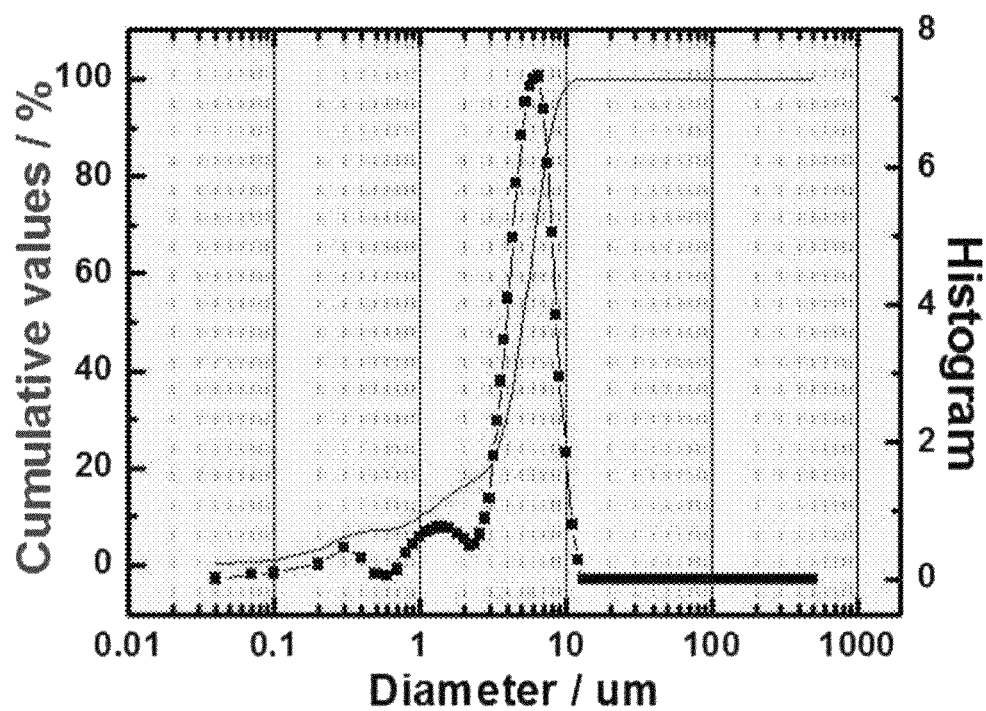

Hereinafter, the embodiments of the inventive concept will be explained in more detail with reference to Examples, but the embodiments of the inventive concept are not limited thereto.

Examples 1 to 4

In a reactor, 4 L of distilled water filled and stirred at 1000 rpm while adding ammonia as the first pH adjusting agent so as to maintain the pH in the reactor at 7 and the internal temperature at 50° C. Into the reactor, a 4 M NaOH solution as the second pH adjusting agent was introduced and the pH in the reactor was adjusted to 10.2 and maintained for 30 minutes.

As an aqueous solution of transition metal compounds, $NiSO_4 \cdot 6H_2O$, $FeSO_4 \cdot 7H_2O$, and $MnSO_4 \cdot 5H_2O$ were mixed together in an equivalent ratio and introduced into the reactor together with $NH_4OH$ as the complexing agent, thereby producing a precursor represented by $Ni_{0.25}Fe_{0.25}Mn_{0.5}(OH)_2$ as presented in the following Table 1.

The precursors of Examples 2 to 4 respectively represented by $Ni_{0.25}Fe_{0.35}Mn_{0.4}(OH)_2$, $Ni_{0.25}Fe_{0.5}Mn_{0.25}(OH)_2$ and $Ni_{0.15}Fe_{0.35}Mn_{0.5}(OH)_2$ were produced in the same manner as in Example 1 except that the mixing ratio of the aqueous solution of transition metal compounds was adjusted in Example 1.

TABLE 1

| Division | Composition |
| --- | --- |
| Example 1 | $Ni_{0.25}Fe_{0.25}Mn_{0.5}(OH)_2$ |
| Example 2 | $Ni_{0.25}Fe_{0.35}Mn_{0.4}(OH)_2$ |
| Example 3 | $Ni_{0.25}Fe_{0.5}Mn_{0.25}(OH)_2$ |
| Example 4 | $Ni_{0.15}Fe_{0.35}Mn_{0.5}(OH)_2$ |
| Example 5 | $Ni_{0.25}Fe_{0.5}Mn_{0.25}C_2O_4$ |
| Example 6 | $Ni_{0.2}Fe_{0.6}Mn_{0.2}C_2O_4$ |
| Example 7 | $Ni_{0.17}Fe_{0.66}Mn_{0.17}C_2O_4$ |
| Example 8 | $Ni_{0.2}Fe_{0.55}Mn_{0.25}C_2O_4$ |
| Example 9 | $Ni_{0.3}Fe_{0.45}Mn_{0.25}C_2O_4$ |
| Example 10 | $Ni_{0.35}Fe_{0.4}Mn_{0.25}C_2O_4$ |
| Example 11 | $Ni_{0.4}Fe_{0.35}Mn_{0.25}C_2O_4$ |
| Example 12 | $Ni_{0.45}Fe_{0.3}Mn_{0.25}C_2O_4$ |

TABLE 1-continued

| Division | Composition |
| --- | --- |
| Example 13 | $(Ni_{0.25}Fe_{0.5}Mn_{0.25})_3O_4$ |
| Example 14 | $(Ni_{0.25}Fe_{0.25}Mn_{0.5})_3O_4$ |

<Experimental Example 1> Taking of SEM Image

The SEM images of the precursors produced in Examples 1 to 4 were taken and the images taken are illustrated in FIGS. 1 to 4.

<Experimental Example 2> Measurement of Particle Size Distribution

The particle size distribution of the precursors produced in Examples 1 to 4 was measured and the results are illustrated in FIGS. 5 to 8.

It can be seen that the particle size distribution of the precursor particles produced in Examples of the embodiments of the inventive concept is a monodisperse type from FIGS. 5 to 8.

Examples 5 to 12

The precursors of Examples 5 to 12 were produced in the same manner as in Example 1 except that the pH in the reactor was adjusted to 7 using ammonia as the first pH adjusting agent, the pH in the reactor was adjusted to 7 using a 0.5 M aqueous solution of ammonium oxalate as the second pH adjusting agent and the mixing ratio of the aqueous solution of transition metal compounds was adjusted so as to have the compositions as presented in Table 1 above.

<Experimental Example 3> Measurement of XRD

Figure 9:
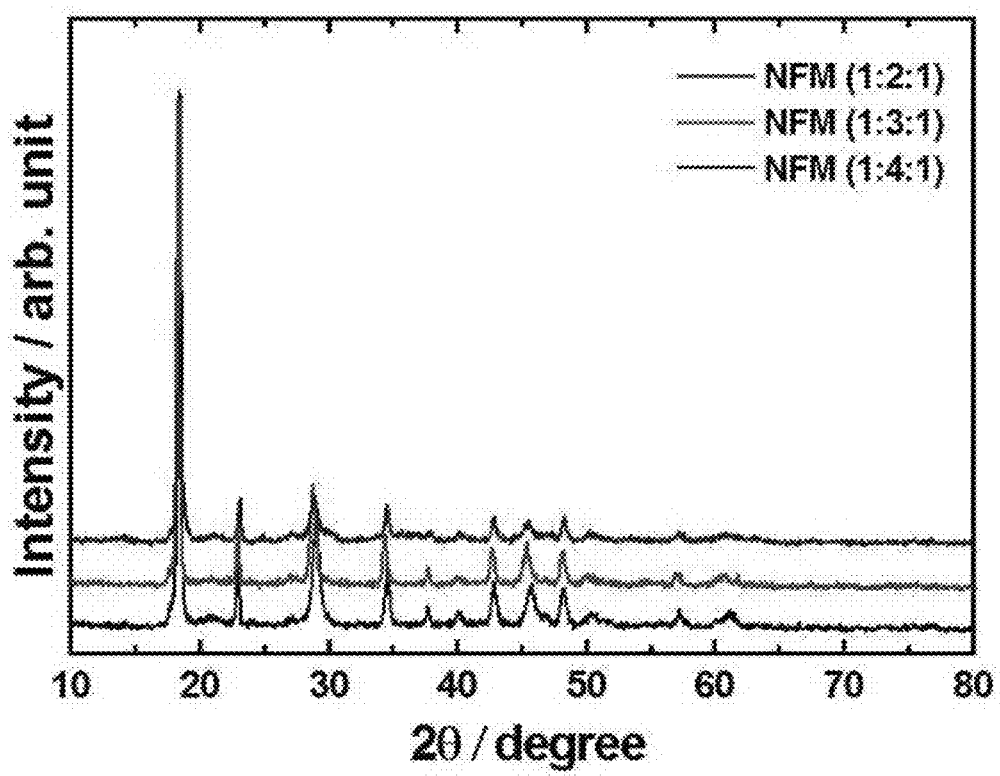
FIGS. 9 and 10 illustrate the measurement results of XRD of the precursors produced in Examples of the embodiments of the inventive concept.

The precursors produced in Examples 5 to 7 were subjected to the XRD measurement and the results are illustrated in FIG. 9.

Figure 10:
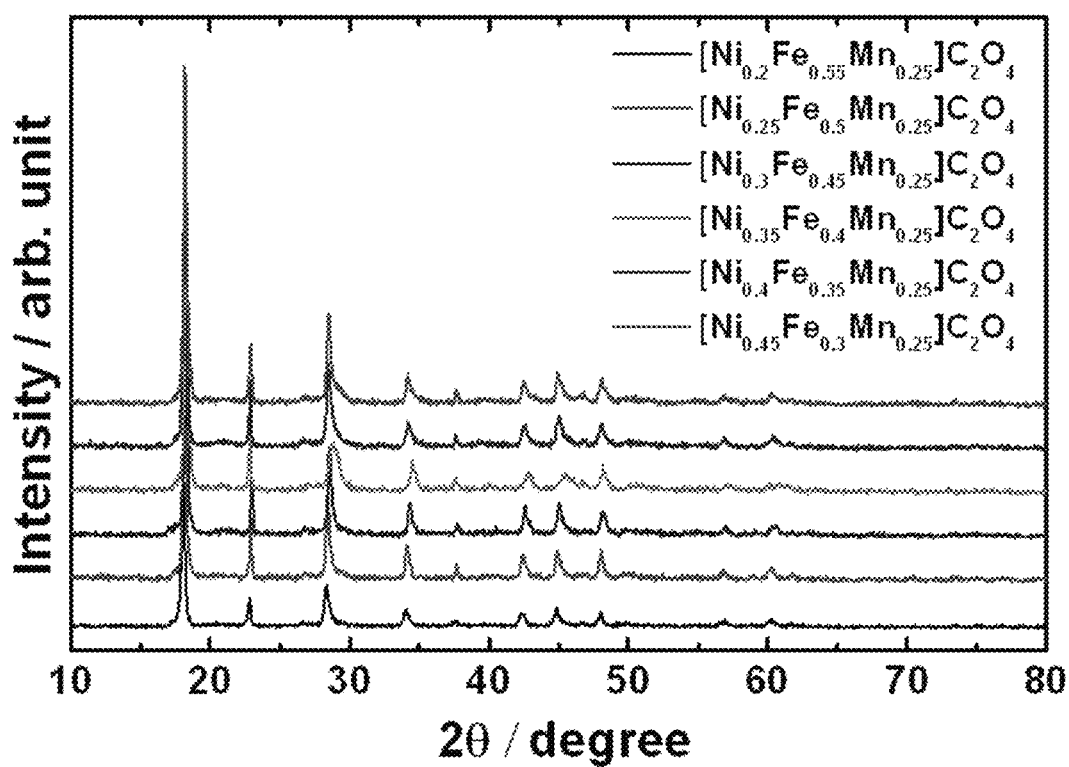

The precursors produced in Examples 5 and 8 to 12 were subjected to the XRD measurement and the results are illustrated in FIG. 10.

<Experimental Example 4> Measurement of Particle Size Distribution

Figure 11:
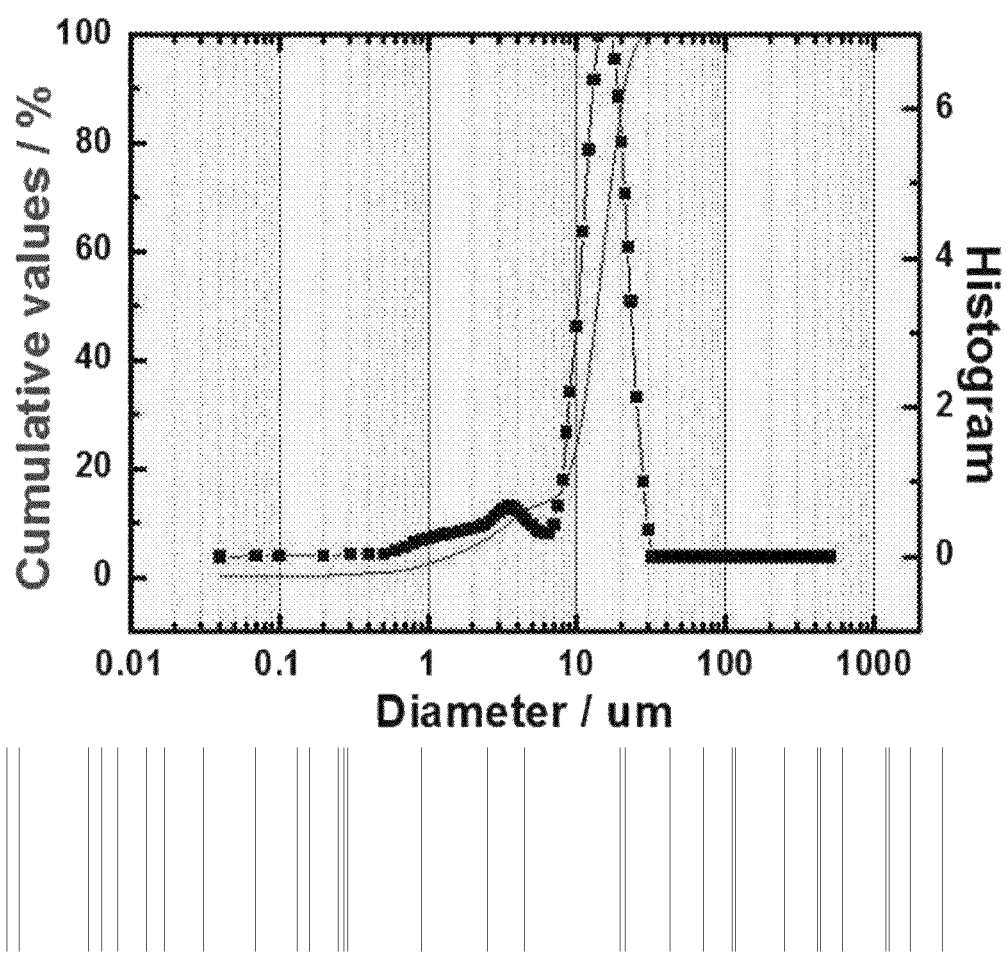
FIG. 11 illustrates the measurement results of the particle size distribution of the precursors produced in Examples of the embodiments of the inventive concept.

The particle size distribution of the precursor produced in Example 5 was measured and the results are illustrated in FIG. 11.

Examples 13 and 14

The precursors of Examples 13 and 14 were produced in the same manner as in Example 1 except that the pH in the reactor was adjusted to 7 using ammonia as the first pH adjusting agent, the pH in the reactor was adjusted to 9.2 adding a 4 M NaOH solution as the second pH adjusting agent, and the mixing ratio of the aqueous solution of transition metal compounds was adjusted so as to have the compositions as presented in Table 1 above.

<Experimental Example 5> Taking of SEM Image

Figure 12:
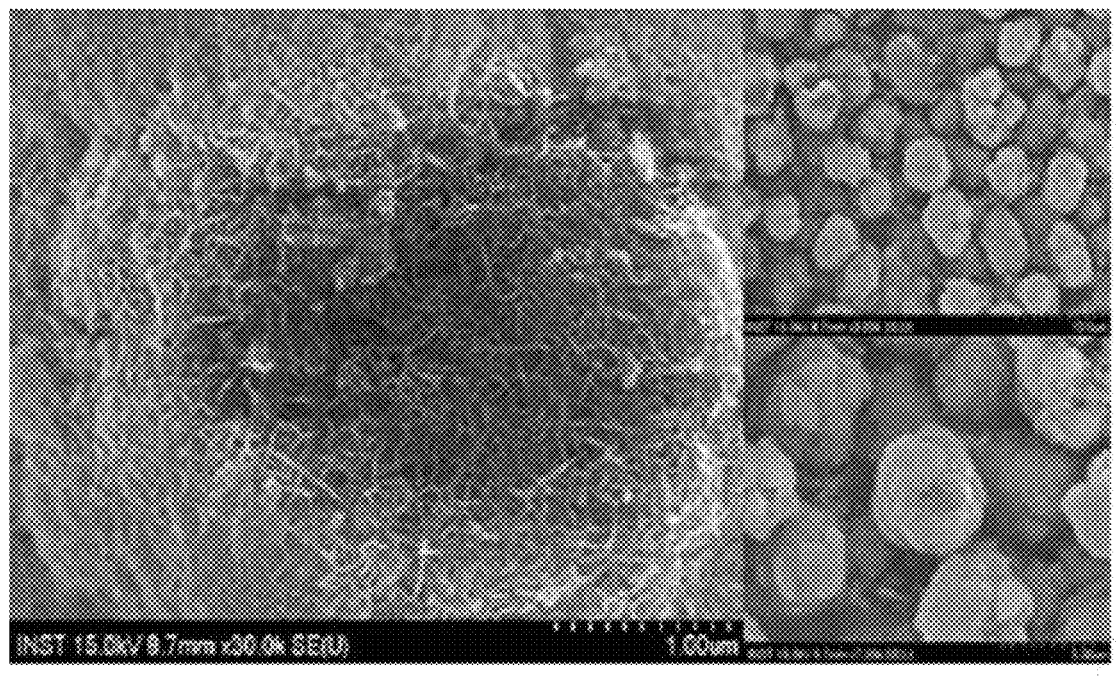
FIGS. 12 and 13 illustrate the SEM images of the precursors produced in Examples of the embodiments of the inventive concept.
Figure 13:
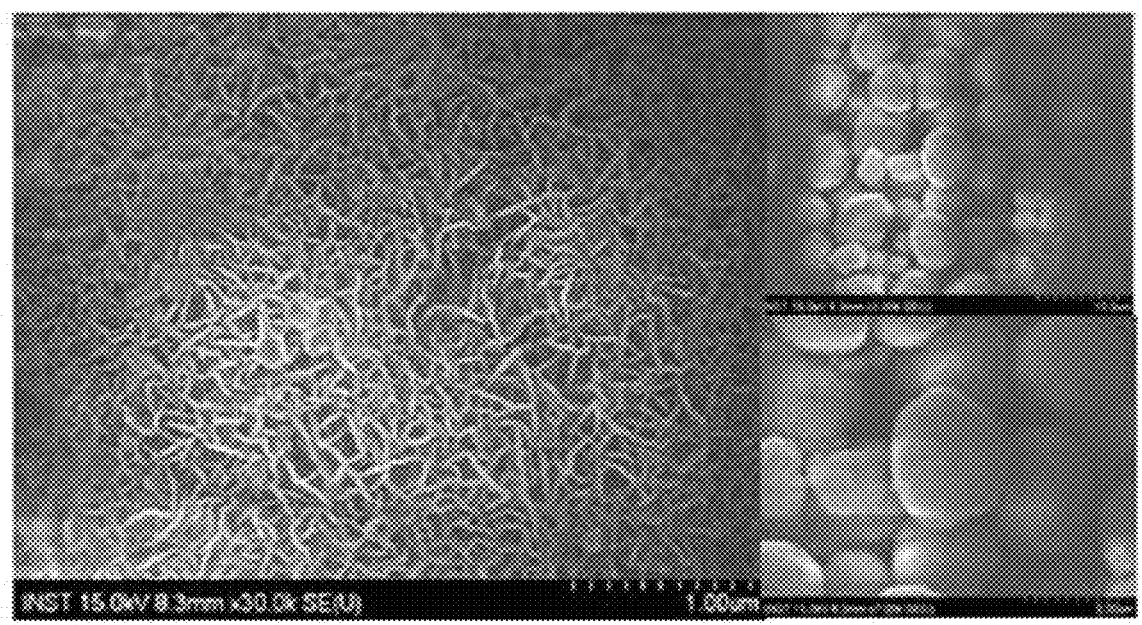

The SEM images of the precursors produced in Examples 13 and 14 were taken and the images taken are illustrated in FIGS. 12 and 13.

<Experimental Example 6> Measurement of Particle Size Distribution

Figure 14:
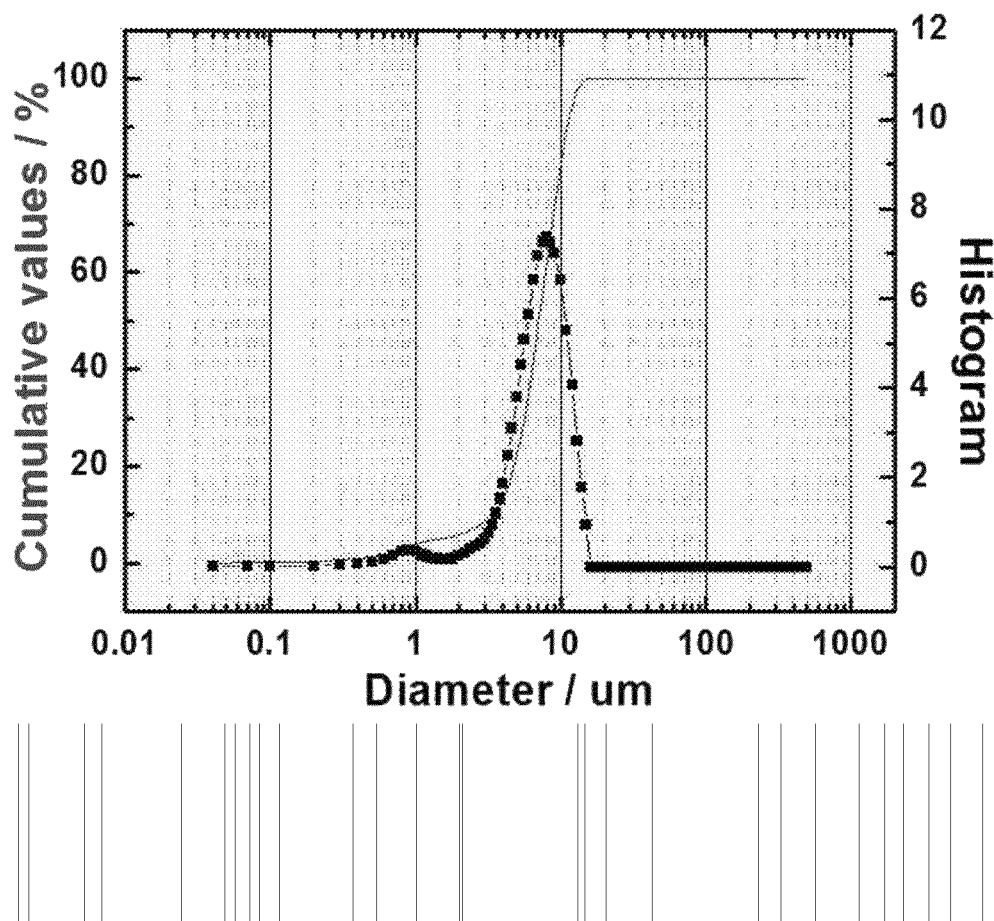
FIGS. 14 and 15 illustrate the measurement results of the particle size distribution of the precursors produced in Examples of the embodiments of the inventive concept.
Figure 15:
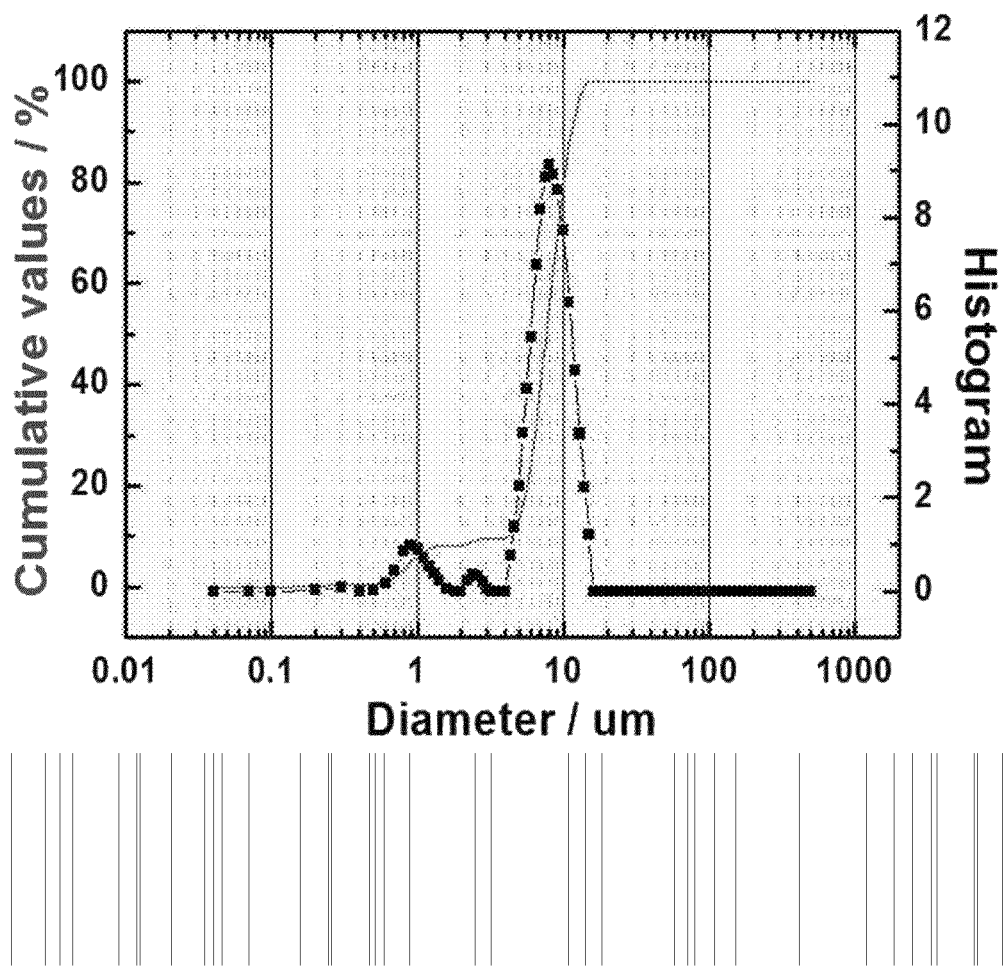
Figure 16:
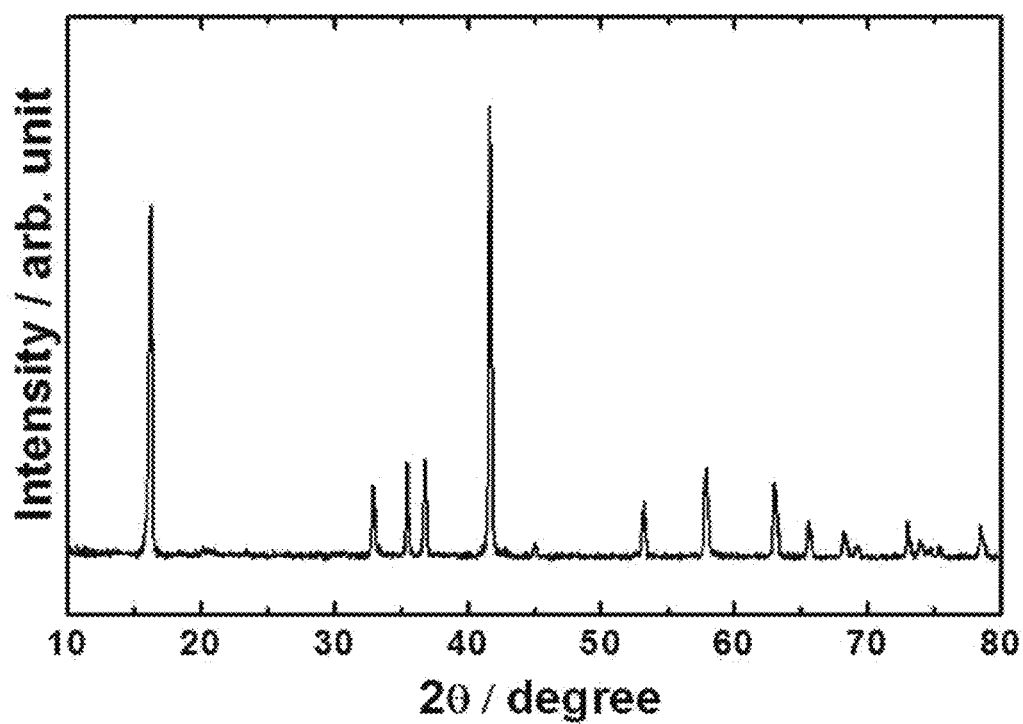
FIGS. 16 to 23 illustrate the measurement results of XRD of the cathode active material produced in an Example of the embodiments of the inventive concept.
Figure 17:
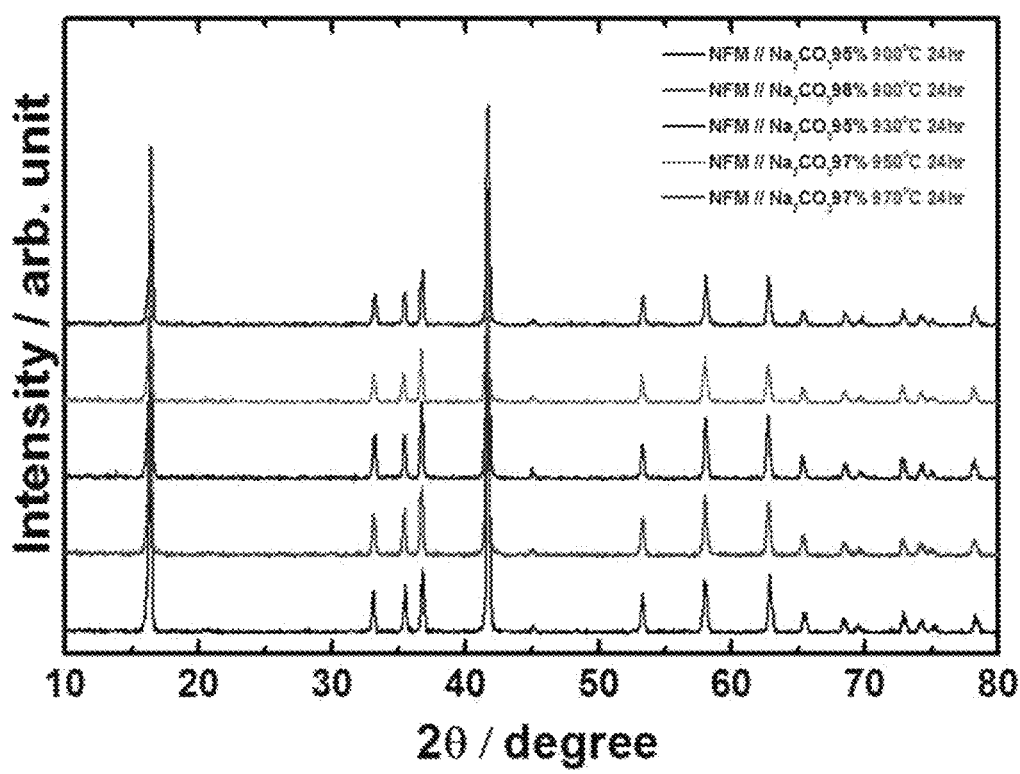
Figure 18:
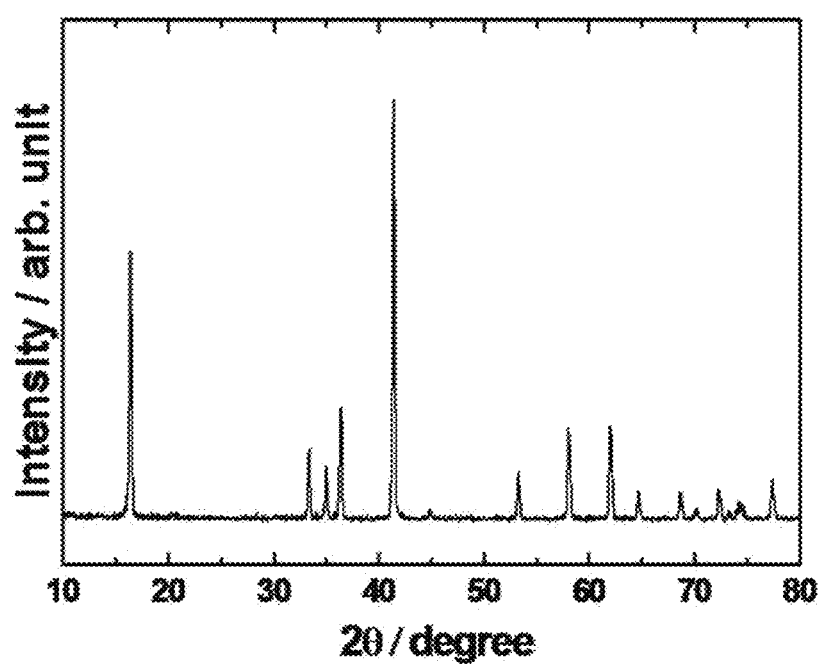
Figure 19:
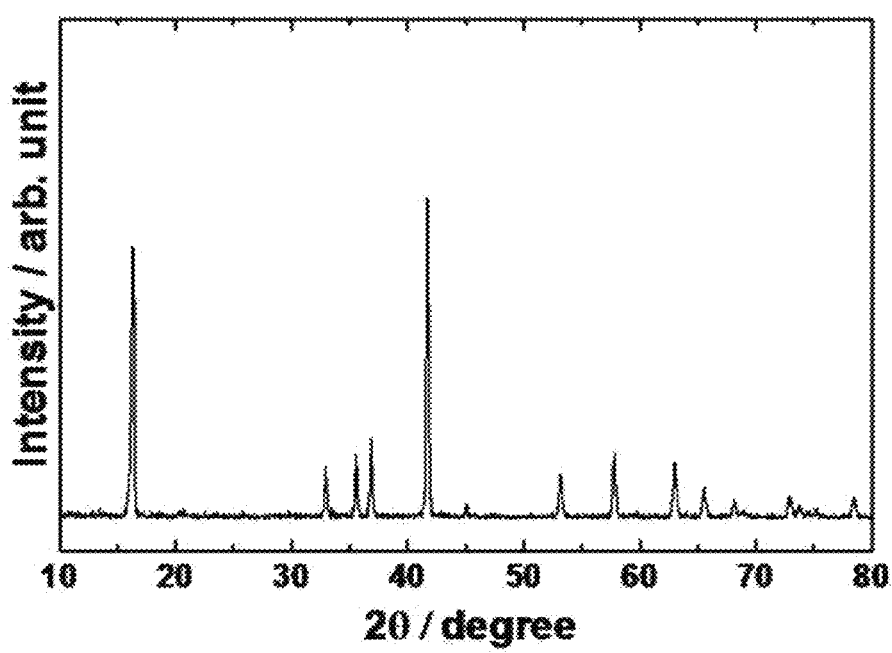

The particle size distribution of the precursors produced in Examples 8 and 9 was measured and the results are illustrated in FIGS. 14 and 15. It can be seen that the particle size distribution of the precursors produced in Examples of the embodiments of the inventive concept is a monodisperse type from FIGS. 14 and 15.

<Examples> Production of Cathode Active Material

The cathode active materials of Examples 15 to 28 were produced by mixing and stirring sodium carbonate as the sodium compound with the precursors produced in Examples 1 to 14 above and then subjecting the mixture thus obtained to a heat treatment.

<Experimental Example> Measurement of XRD

Figure 20:
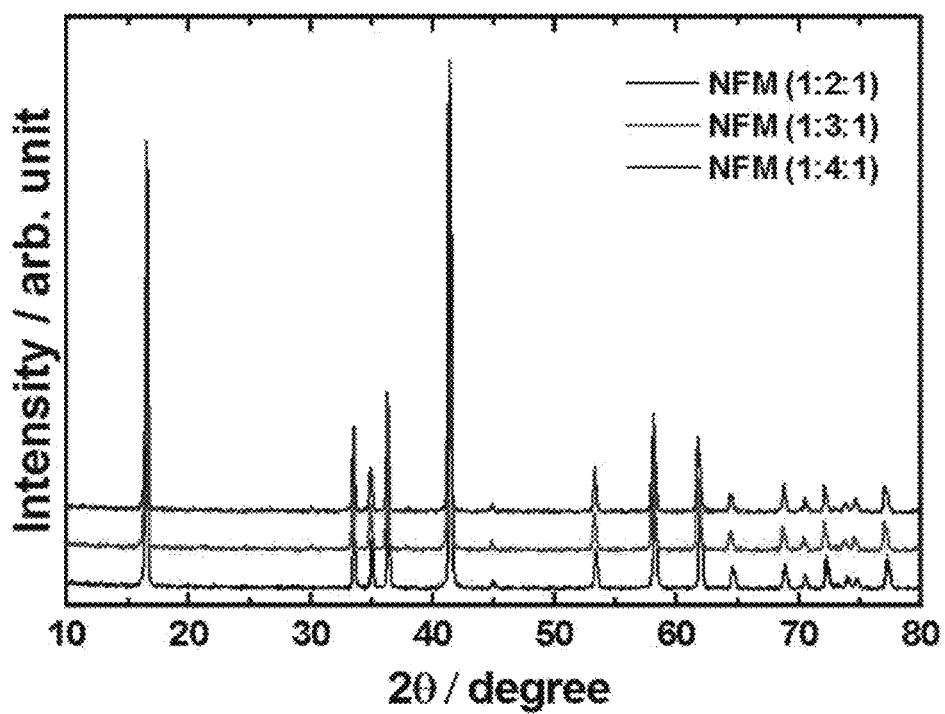
Figure 21:
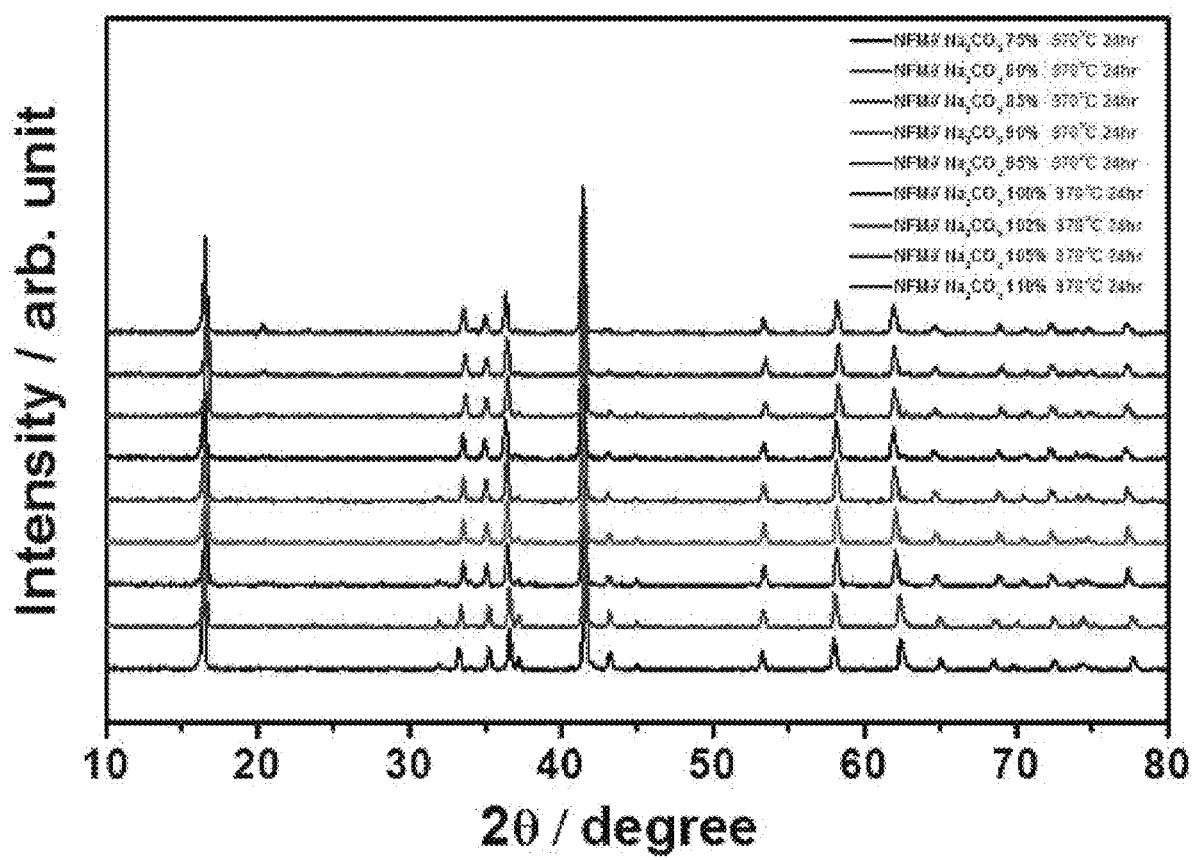
Figure 22:
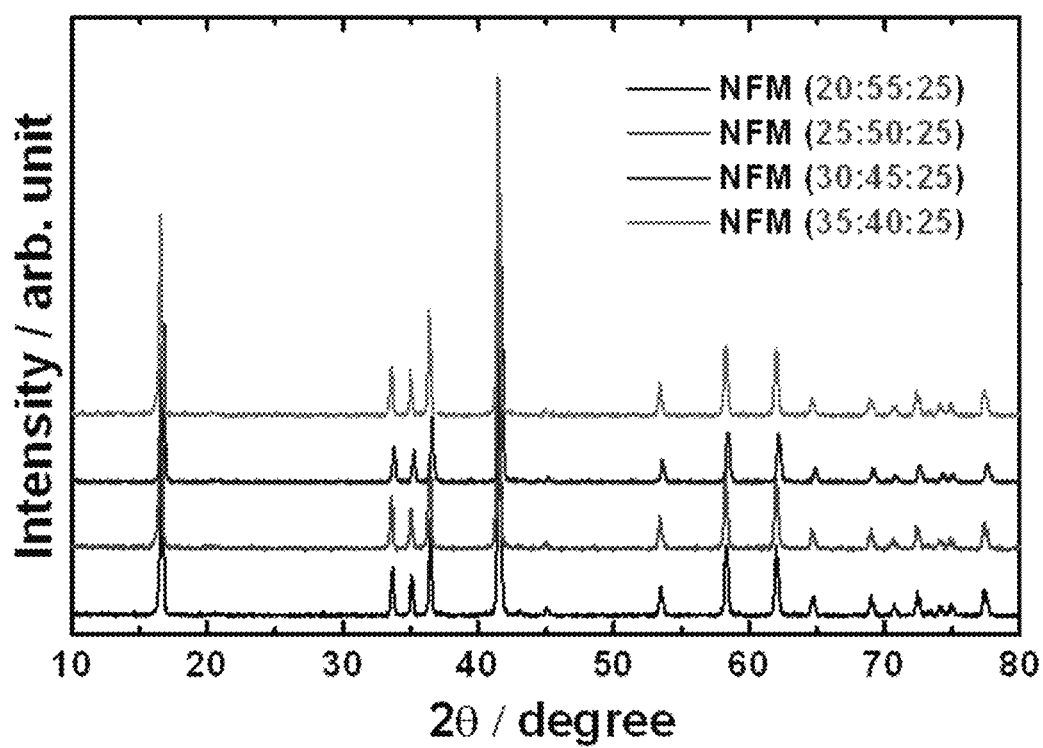
Figure 23:
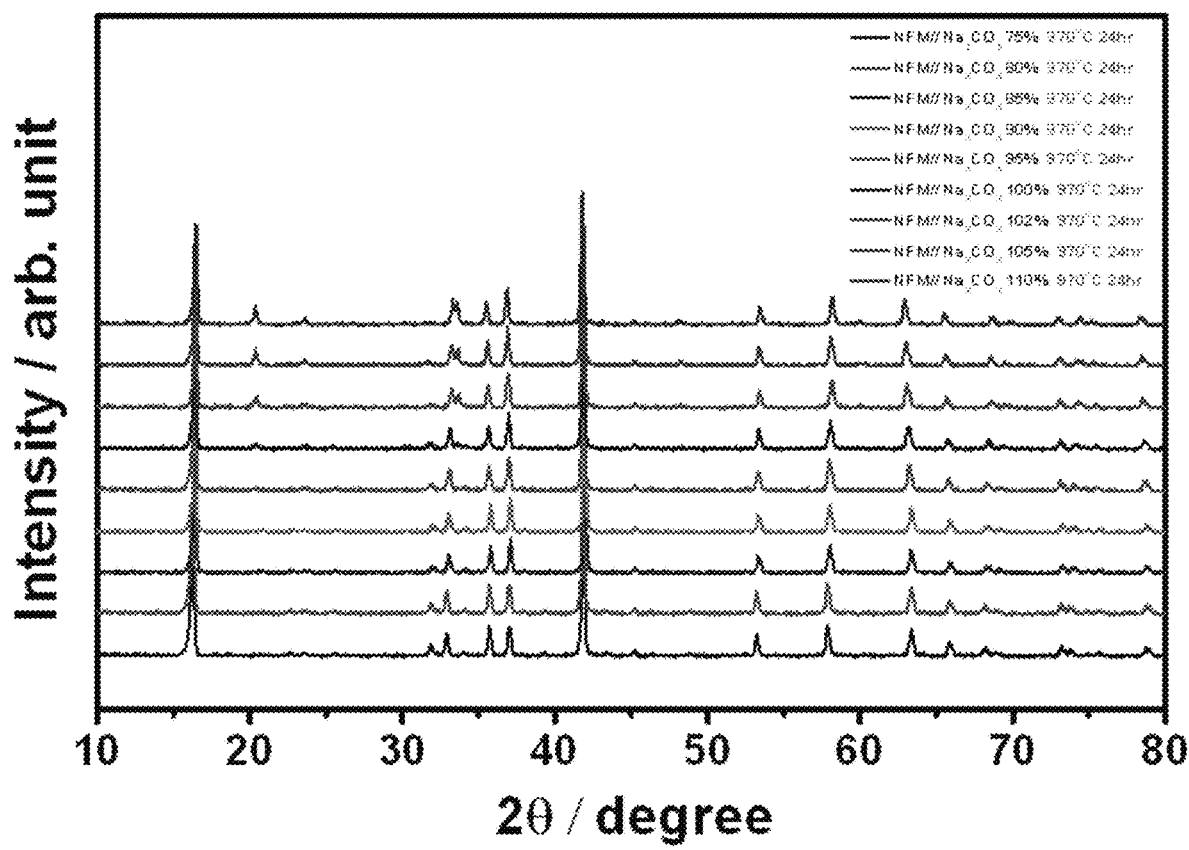

The measurement results of XRD of the cathode active materials produced in Examples 15 to 18 are illustrated in FIGS. 16 to 19, respectively, the measurement results of XRD of the cathode active materials produced in Examples 17 to 19 are illustrated in FIG. 20, the measurement results of XRD of the cathode active materials produced in Examples 20 to 22 are illustrated in FIG. 21, and FIG. 20, and the measurement results of XRD of the cathode active materials produced in Examples 23 and 24 are illustrated in FIGS. 22 and 23.

It can be seen that three peaks appear at 2θ=in a range of from 30° to 40° and the (104) main peak that is a characteristic of an $O_3$-type crystal structure appears at 2θ=in a range of from 40° to 45° in XRD pattern of the cathode active materials for a sodium secondary battery produced in Examples of the embodiments of the inventive concept.

<Experimental Example> Taking of SEM Image

Figure 24:
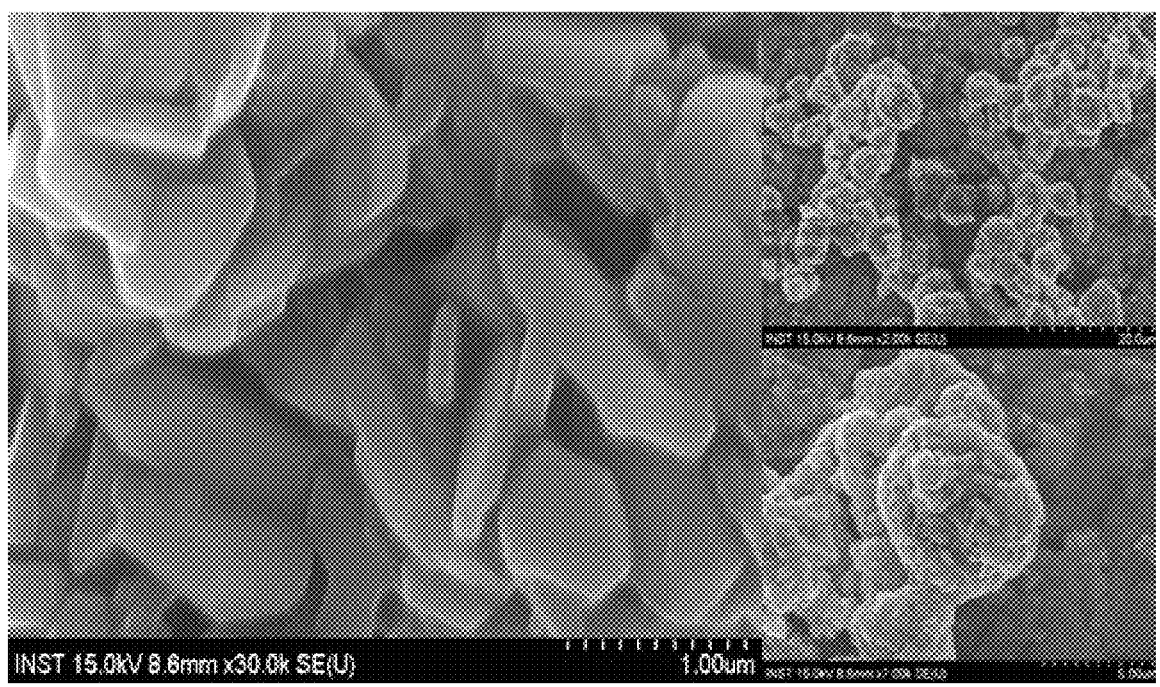
FIGS. 24 and 25 illustrate the SEM images of the cathode active material produced in an Example of the embodiments of the inventive concept.
Figure 25:
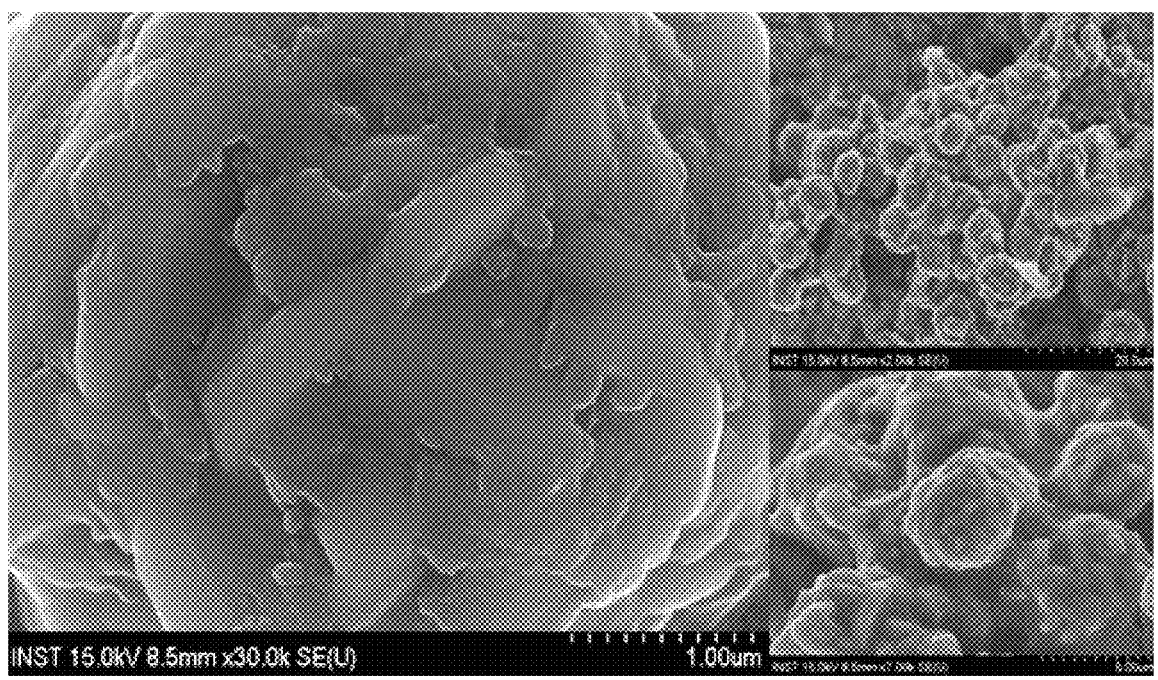
Figure 26:
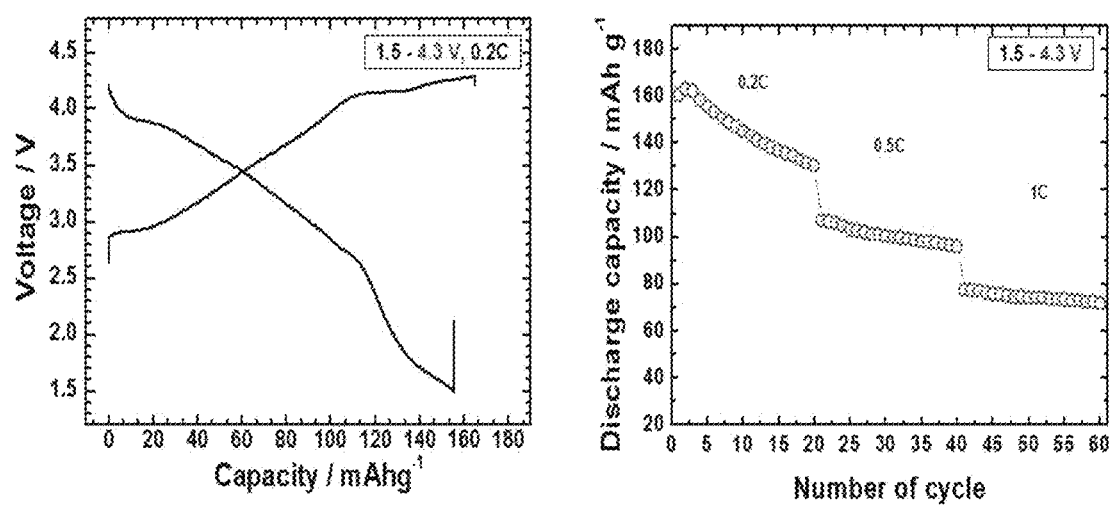
FIGS. 26 to 36 illustrate the measurement results of the charge and discharge characteristics and lifespan characteristics of a battery containing the cathode active material produced in an Example of the embodiments of the inventive concept.
Figure 27:
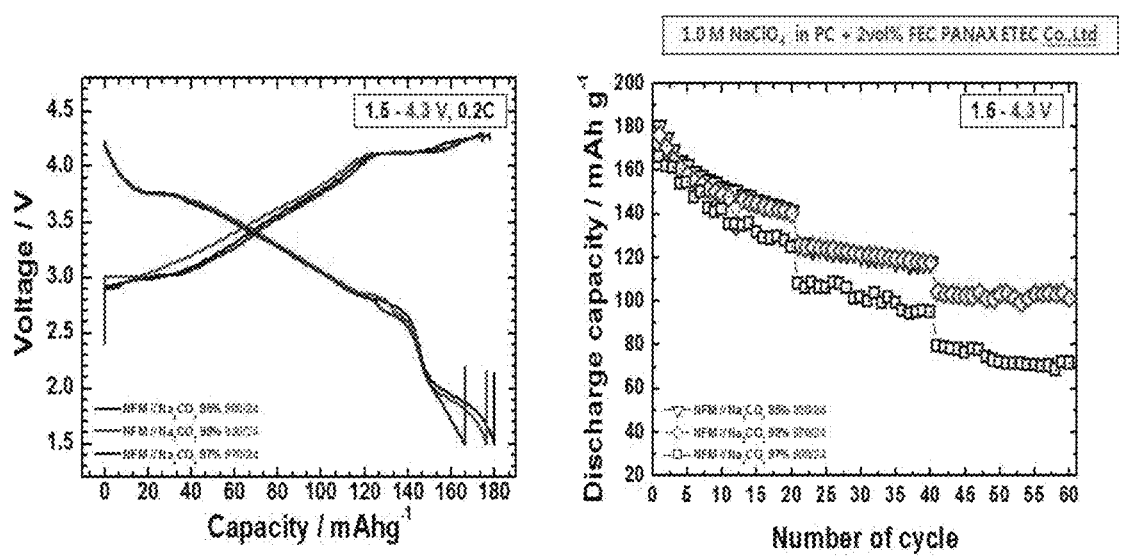
Figure 28:
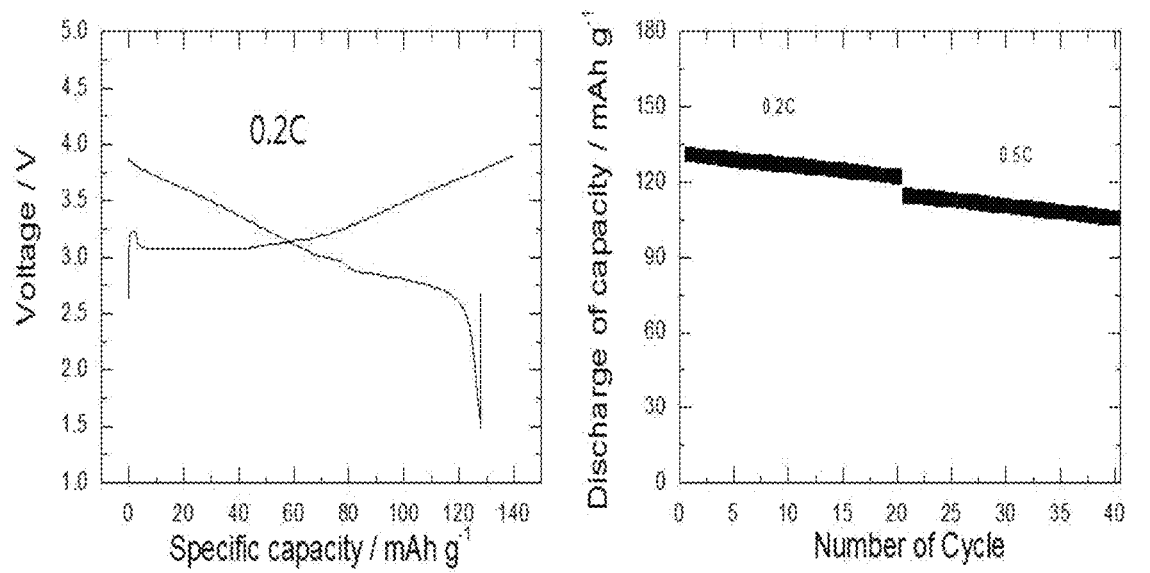
Figure 29:
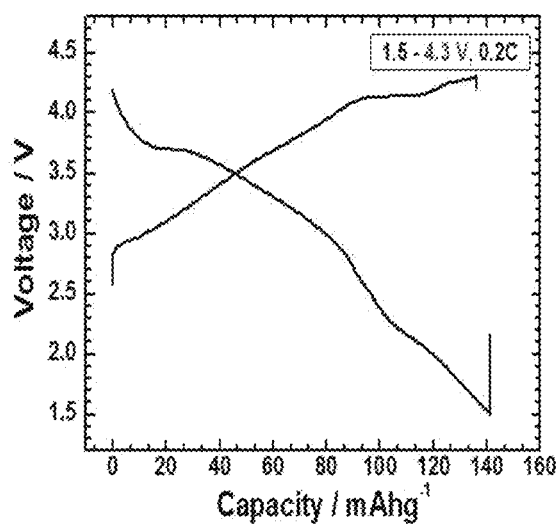
Figure 29:
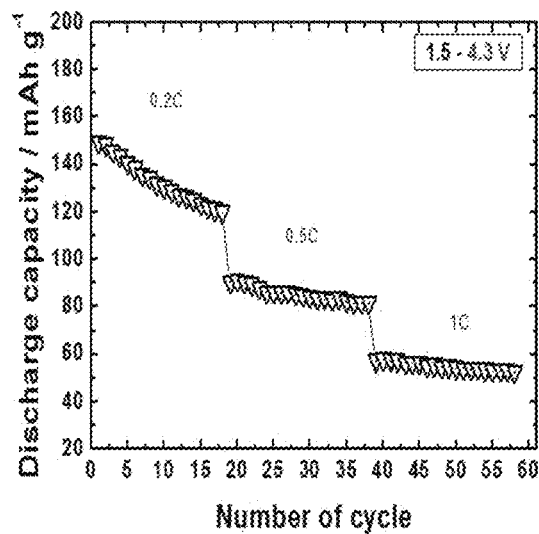

The SEM images of the cathode active material that was produced in Example 19 and represented by [$Ni_{0.25}Fe_{0.5}Mn_{0.25}]O_2$ and the cathode active material that was produced in Example 28 and represented by [$Ni_{0.25}Fe_{0.25}Mn_{0.5}]O_2$ were taken and the images taken are illustrated in FIGS. 24 and 25.

<Production Example> Production of Battery

The composite metal oxide E1, acetylene black (manufactured by DENKI KAGAKU KOGYO KABUSHIKI KAISHA) as the electrically conductive material, and PVDF (PolyVinylideneDiFluoridePolyflon manufactured by KUREHA CORPORATION) as the binder were respectively weighed so as to have a composition of composite metal oxide:electrically conductive material:binder=85:10:5 (weight ratio).

Thereafter, first the composite metal oxide and acetylene black were thoroughly mixed using an agate mortar, N-methyl-2-pyrrolidone (NMP, manufactured by Tokyo chemical industry Co., Ltd.) was added to this mixture in an appropriate amount, PVDF was then further added thereto, and the resultant was uniformly mixed to obtain a slurry. The slurry thus obtained was coated on an aluminum foil having a thickness of 40 μm as the current collector using an applicator so as to have a thickness of 100 μm, this was then placed in a dryer and thoroughly dried while removing NMP, thereby obtaining a cathode sheet. This cathode sheet was punched using an electrode punching machine so as to have a diameter of 1.5 cm and then sufficiently pressed using a hand press, thereby fabricating a cathode.

The cathode thus fabricated was placed in the recess of the lower part of a coin cell (manufactured by Hohsen Corporation) such that the aluminum foil faces down, subsequently 1 M $NaClO_4$/propylene carbonate+2 vol % fluoroethylene carbonate (FEC) as the non-aqueous electrolytic solution, a polypropylene porous film (thickness: 20 μm) as the separator, and a sodium metal as the anode were then combined therewith, thereby fabricating a sodium secondary battery.

<Experimental Example> Measurement of Charge and Discharge Characteristics

The measurement results of the charge and discharge characteristics of the sodium secondary batteries containing the active materials of Examples 15 to 21 and Example 27 produced from the precursors of Examples 1 to 7 and Examples 13 are presented in the following Table 2.

From the following Table 2, it can be seen that the batteries containing the active materials produced using the cathode active material precursors for a sodium secondary battery produced by the embodiments of the inventive concept exhibit an initial charge and discharge efficiency of 90% or more.

TABLE 2

| Division | Sintering conditions and charge and discharge conditions | 0.2 C $1^{st}$ | $1^{st}$ Efficiency |
|---|---|---|---|
| Example 1 Example 15 | $Ni_{0.25}Fe_{0.25}Mn_{0.5}(OH)_2$ precursor Na 95%, 970° C./24 h sintered, 4.3 V | 155.5 mAh/g | 94.1% |
| Example 2 Example 16 | $Ni_{0.25}Fe_{0.35}Mn_{0.4}(OH)_2$ precursor Na 98%, 900° C./24 h sintered, 4.3 V | 180.1 mAh/g | 101.2% |
| | $Ni_{0.25}Fe_{0.35}Mn_{0.4}(OH)_2$ precursor Na 98%, 930° C./24 h sintered, 4.3 V | 176.3 mAh/g | 100.9% |
| | $Ni_{0.25}Fe_{0.35}Mn_{0.4}(OH)_2$ precursor Na 98%, 970° C./24 h sintered, 4.3 V | 166.2 mAh/g | 95.4% |
| Example 3 Example 17 | $Ni_{0.25}Fe_{0.5}Mn_{0.25}(OH)_2$ precursor Na 98%, 970° C./24 h sintered, 3.9 V | 130.7 mAh/g | 91.6% |
| Example 4 Example 18 | $Ni_{0.15}Fe_{0.35}Mn_{0.5}(OH)_2$ precursor Na 98%, 970° C./24 h sintered, 4.3 V | 141.3 mAh/g | 104% |
| Example 5 Example 19 | $Ni_{0.25}Fe_{0.5}Mn_{0.25}C_2O_4$ precursor Na 98%, 950° C./24 h sintered, 3.9 V | 135.7 mAh/g | 93.4% |
| Example 6 Example 20 | $Ni_{0.2}Fe_{0.6}Mn_{0.2}C_2O_4$ precursor Na 98%, 950° C./24 h sintered, 3.8 V | 123.0 mAh/g | 93.6% |
| Example 7 Example 21 | $Ni_{0.17}Fe_{0.66}Mn_{0.17}C_2O_4$ precursor Na 98%, 950° C./24 h sintered, 3.7 V | 116.8 mAh/g | 91.8% |
| Example 13 Example 27 | $(Ni_{0.25}Fe_{0.5}Mn_{0.25})_3O_4$ precursor Na 98%, 970° C./24 h sintered, 3.9 V | 124.3 mAh/g | 92.1% |

<Experimental Example> Measurement of Lifespan Characteristics

The measurement results of the charge and discharge characteristics of the sodium secondary batteries containing the active materials of Examples 15 to 18 and Example 22 produced from the precursors produced in Examples 1 to 4 and Example 8 are presented in the following Table 3.

Figure 30:
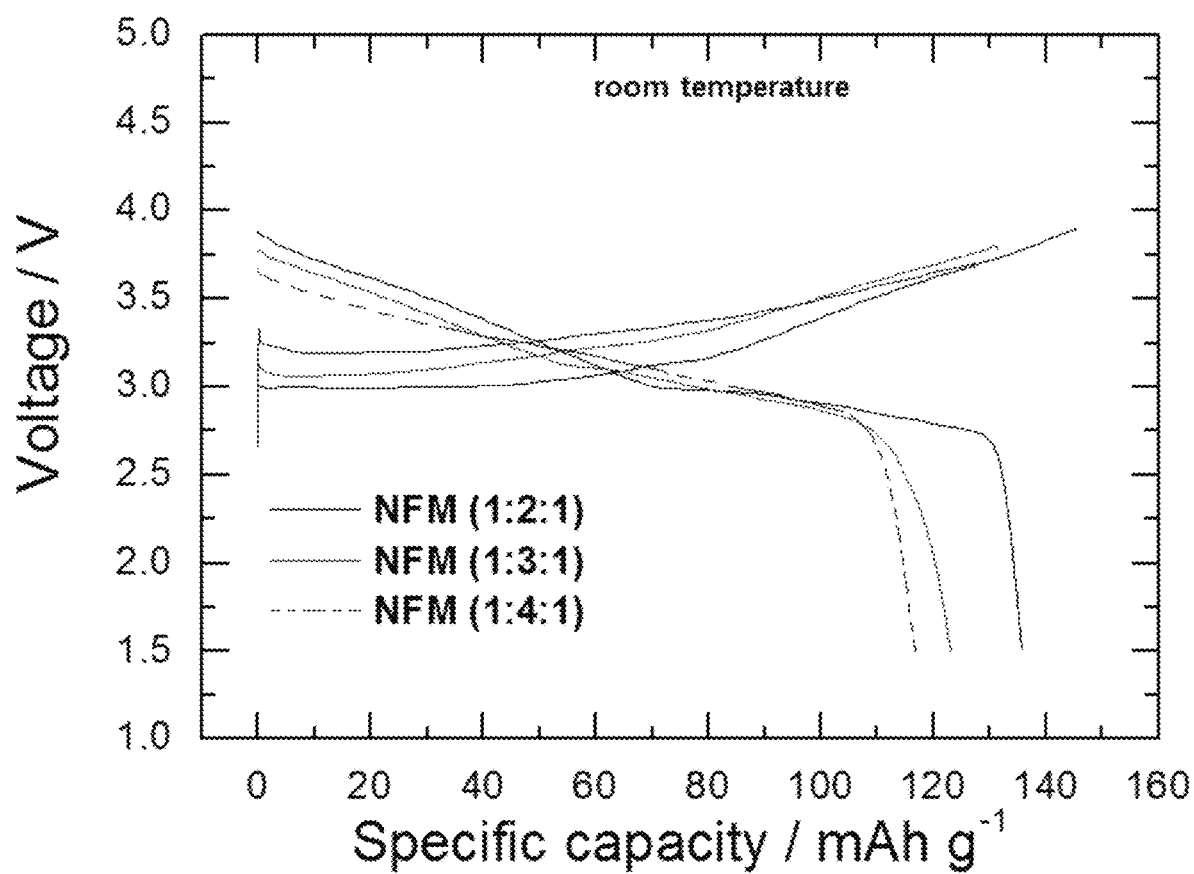
Figure 31:
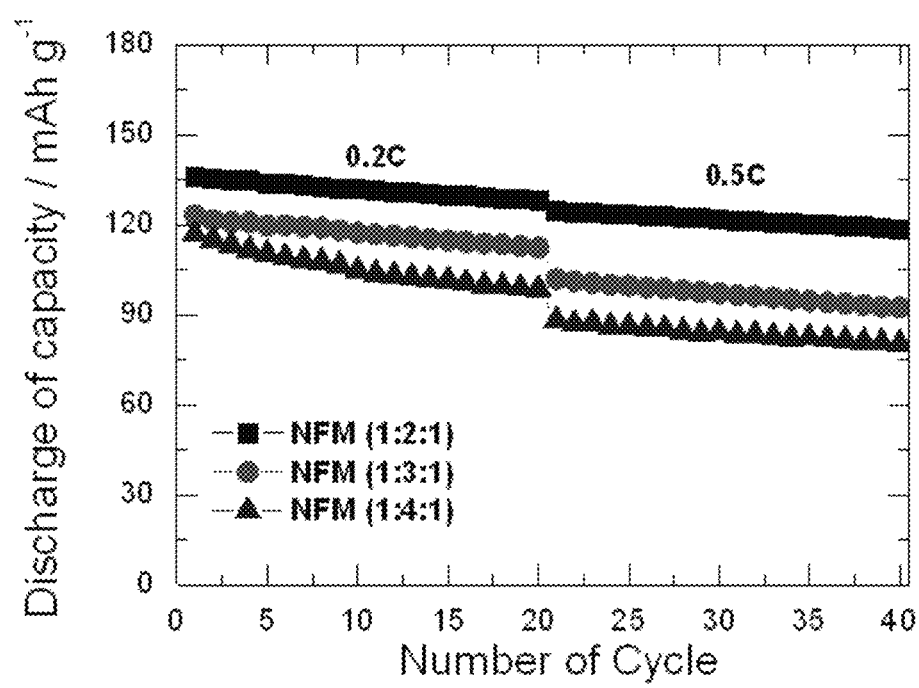
Figure 32:
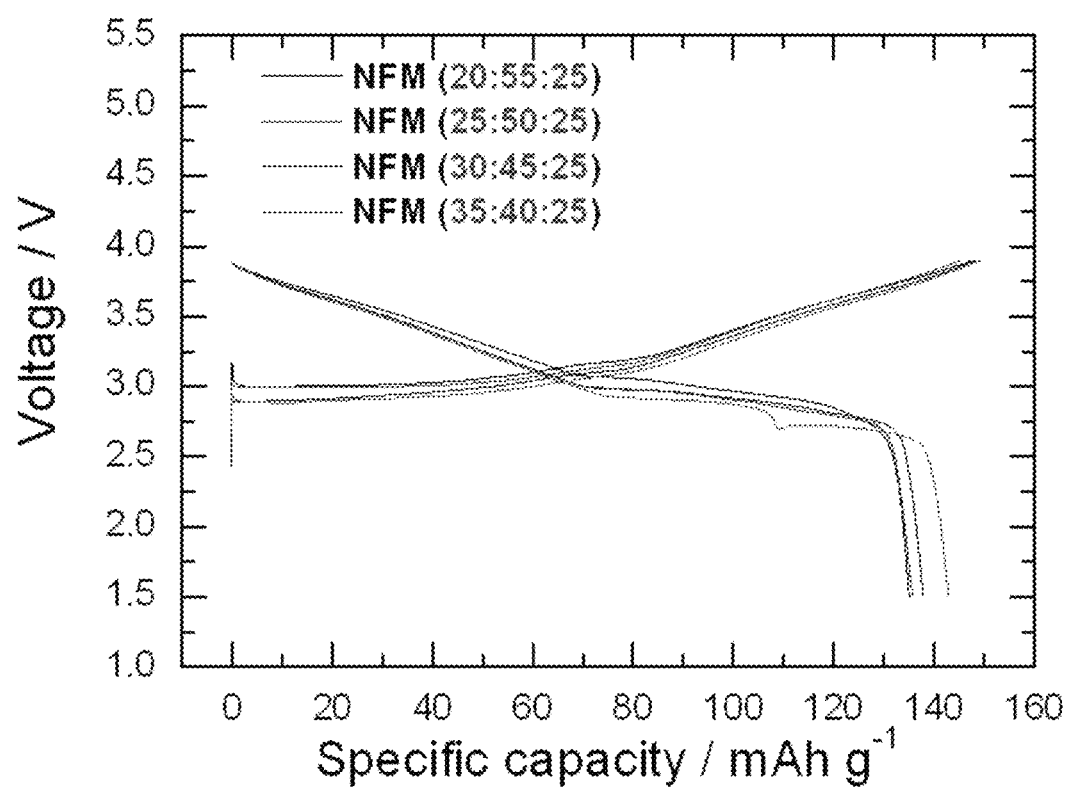
Figure 33:
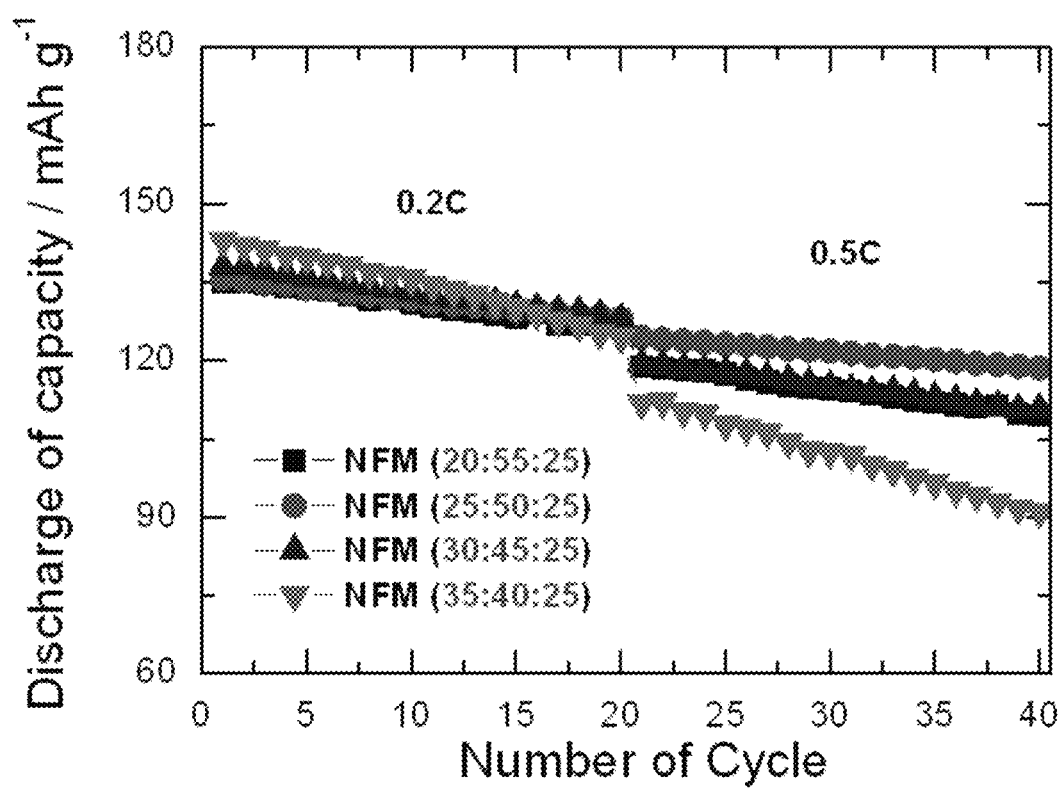
Figure 34:
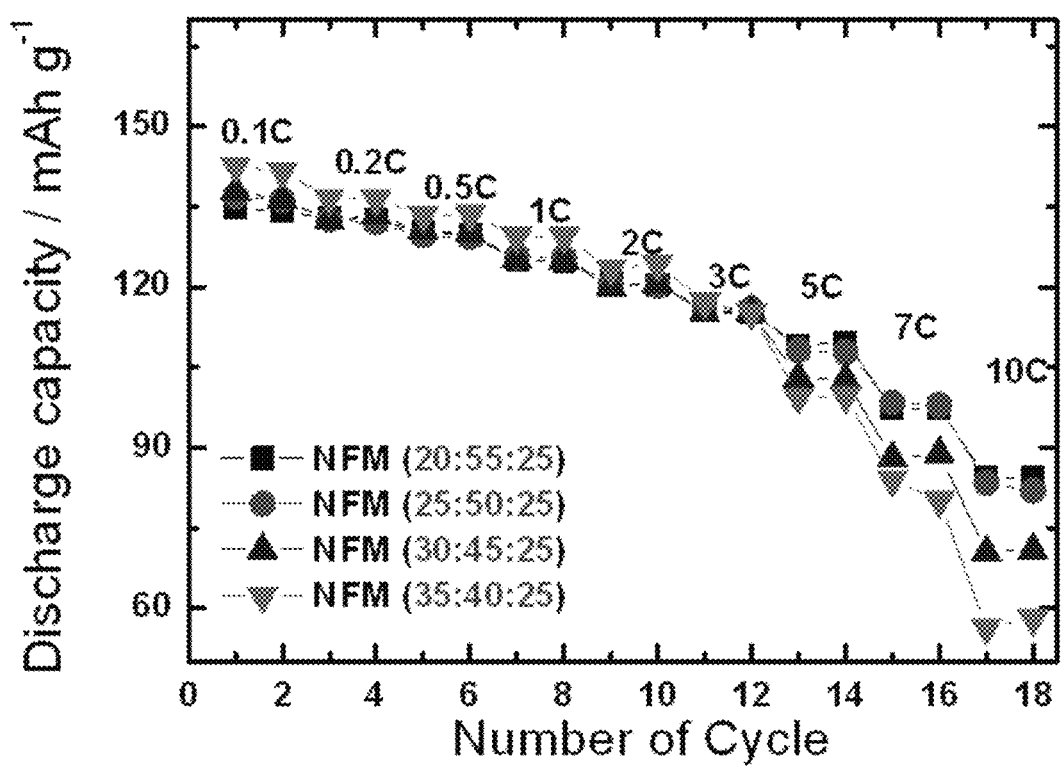
Figure 35:
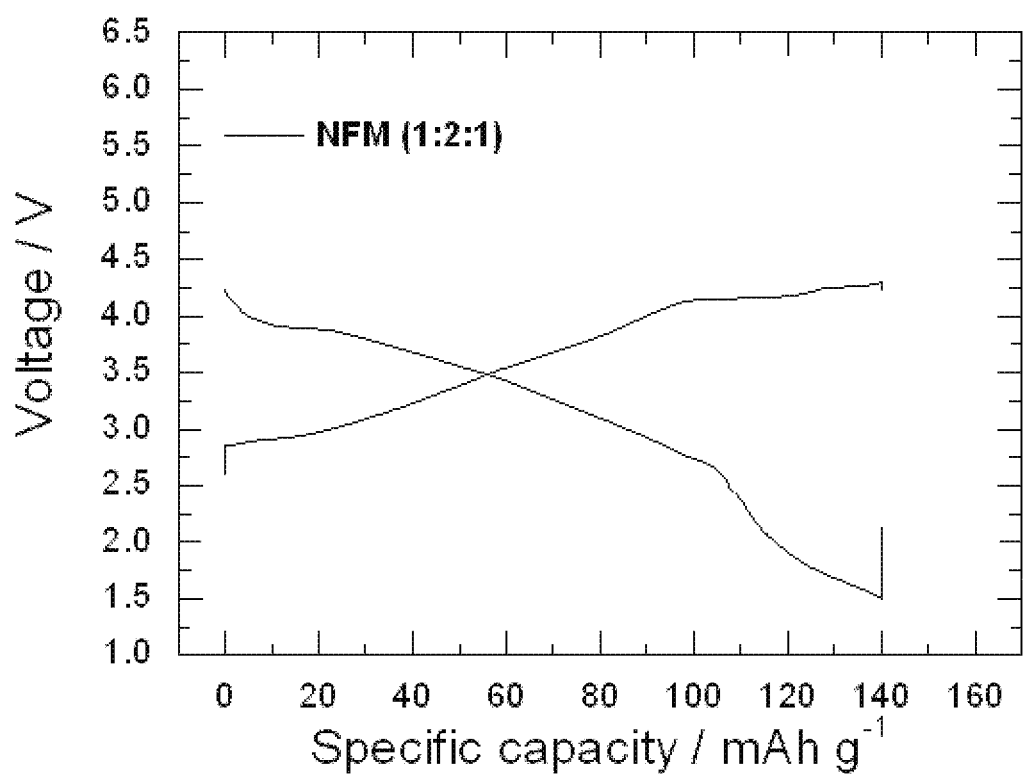
Figure 36:
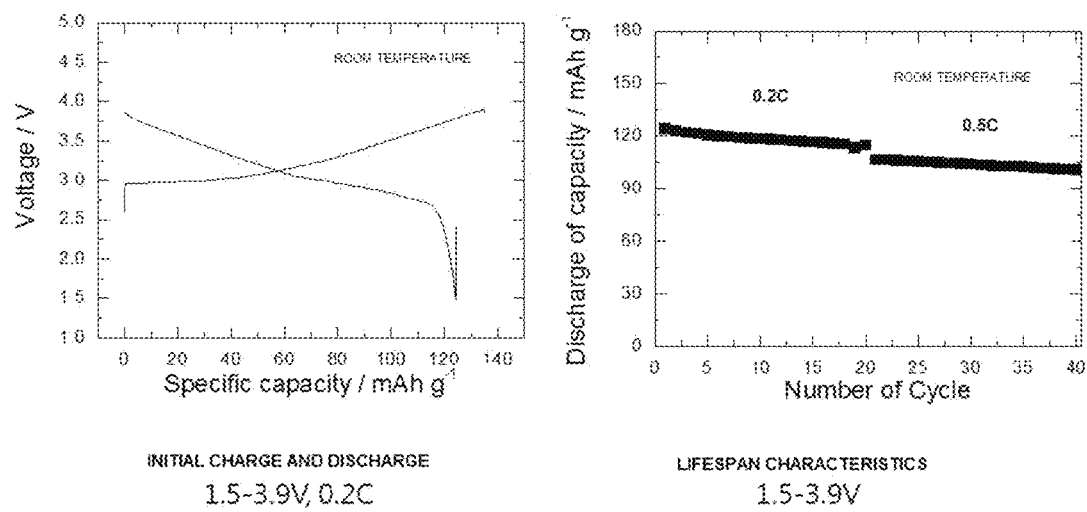

The measurement results of the charge and discharge characteristics of the sodium secondary batteries containing the active materials produced from the precursors produced in Examples 1 to 4 are illustrated in FIGS. 26 to 29, the measurement results of the charge and discharge characteristics and lifespan characteristics of the sodium secondary batteries containing the active materials produced from the precursors produced in Examples 5 to 7 are illustrated in FIGS. 30 and 31, the measurement results of the charge and discharge characteristics and lifespan characteristics of the sodium secondary batteries containing the active materials produced from the precursors produced in Example 5 and Examples 8 to 10 are illustrated in FIGS. 32 to 34, and the measurement results of the charge and discharge characteristics and lifespan characteristics of the sodium secondary batteries containing the active materials which have been produced from the precursors produced in Examples 11 and 12 and have an $O_3$-type crystal structure are illustrated in FIGS. 35 and 36.

TABLE 3

| Division | 0.2 C 1st | 0.2 C 20th | 0.2 C retention | 0.5 C 1st | 0.5 C 20th | 0.5 C retention |
|---|---|---|---|---|---|---|
| Example 1 / Example 15 | 155.5 mAh/g | 130.2 mAh/g | 83.7% | 106.9 mAh/g | 96.0 mAh/g | 89.8% |
| Example 2 / Example 16 | 180.1 mAh/g | 141.3 mAh/g | 78.5% | 125.6 mAh/g | 117.5 mAh/g | 93.6% |
|  | 176.3 mAh/g | 140.5 mAh/g | 76.7% | 125.9 mAh/g | 117.8 mAh/g | 93.6% |
|  | 166.2 mAh/g | 124.6 mAh/g | 75.0% | 107.7 mAh/g | 95.1 mAh/g | 88.3% |
| Example 3 / Example 17 | 130.7 mAh/g | 122.0 mAh/g | 93.3% | 114.3 mAh/g | 105.4 mAh/g | 92.2% |
| Example 4 / Example 18 | 141.3 mAh/g | 119.9 mAh/g | 84.9% | 90.7 mAh/g | 81.7 mAh/g | 90.1% |
| Example 8 / Example 22 | 124.3 mAh/g | 114.7 mAh/g | 92.3% | 106.5 mAh/g | 100.7 mAh/g | 94.6% |

From Table 3, it can be seen that the sodium secondary batteries containing the precursors produced by the embodiments of the inventive concept have a charge and discharge efficiency of about 90% until the 20th cycle to exhibit significantly excellent lifespan characteristics.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for producing a cathode active material precursor for a sodium secondary battery by using a coprecipitation technique, the method comprising:
   (a) introducing distilled water and a first pH adjusting agent into a coprecipitation reactor, supplying air or a nitrogen gas to the reactor, and maintaining a pH in the reactor at from 6.5 to 7.5 while stirring;
   (b) adjusting the pH in the reactor at from 6.5 to 11 by continuously introducing a second pH adjusting agent into the reactor and mixing the mixture; and
   (c) forming particles of a cathode active material precursor for a sodium secondary battery by introducing an aqueous solution of transition metal compounds containing a nickel salt, an iron salt, and a manganese salt in an equivalent ratio and a complexing agent into the reactor.

2. The method for producing a cathode active material precursor for a sodium secondary battery by using a coprecipitation technique according to claim 1, wherein the first pH adjusting agent in (a) above is ammonia or ammonium sulfate.

3. The method for producing a cathode active material precursor for a sodium secondary battery by using a coprecipitation technique according to claim 1, wherein the second pH adjusting agent in (b) above is selected from the group consisting of ammonium oxalate, KOH, and NaOH.

4. The method for producing a cathode active material precursor for a sodium secondary battery by using a coprecipitation technique according to claim 3, wherein the pH in the reactor is adjusted to from 10 to 11 in the case of introducing NaOH or KOH as the second pH adjusting agent in (b) above.

5. The method for producing a cathode active material precursor for a sodium secondary battery by using a coprecipitation technique according to claim 3, wherein the pH in the reactor is adjusted to from 6.5 to 11 in the case of introducing ammonium oxalate as the second pH adjusting agent in (b) above.

6. The method for producing a cathode active material precursor for a sodium secondary battery by using a coprecipitation technique according to claim 1, wherein
   the nickel salt is selected from the group consisting of nickel sulfate, nickel nitrate, nickel chloride, nickel fluoride, nickel acetate, and nickel hydroxide,
   the iron salt is selected from the group consisting of iron sulfate, iron nitrate, iron chloride, iron fluoride, iron acetate, and iron hydroxide, and
   the manganese salt is selected from the group consisting of manganese sulfate, manganese nitrate, manganese chloride, manganese fluoride, manganese acetate, and manganese hydroxide in (c) above.

7. The method for producing a cathode active material precursor for a sodium secondary battery by using a coprecipitation technique according to claim 1, wherein the complexing agent is selected from the group consisting of an aqueous solution of ammonia ($NH_4OH$), ammonium sulfate (($NH_4)_2SO_4$), ammonium nitrate ($NH_4NO_3$), and diammonium hydrogen phosphate (($NH_4)_2HPO_4$) in (c) above.

8. The method for producing a cathode active material precursor for a sodium secondary battery by using a coprecipitation technique according to claim 1, wherein a ratio of a concentration of the complexing agent to a concentration of the aqueous solution of transition metal compounds is from 0.8 to 1.2 in (c) above.

* * * * *